United States Patent
Li et al.

(10) Patent No.: US 10,432,690 B1
(45) Date of Patent: *Oct. 1, 2019

(54) MANIFEST PARTITIONING

(71) Applicant: Amazon Technologies, Inc., Seattle, WA (US)

(72) Inventors: Lei Li, Kirkland, WA (US); Yongjun Wu, Bellevue, WA (US); Samuel James Van Pelt, Seattle, WA (US); Amarsingh Buckthasingh Winston, Seattle, WA (US); Kyle Bradley Koceski, Seattle, WA (US); Mairo Pedrini, Seattle, WA (US); Christopher Steven Mark Pringle, Chesterton (GB); Mushegh Malkhasyan, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/888,410

(22) Filed: Feb. 5, 2018

Related U.S. Application Data

(63) Continuation-in-part of application No. 15/173,499, filed on Jun. 3, 2016, now Pat. No. 10,104,143.

(51) Int. Cl.
*H04L 29/06* (2006.01)
*H04L 29/08* (2006.01)

(52) U.S. Cl.
CPC ........ *H04L 65/602* (2013.01); *H04L 65/4069* (2013.01); *H04L 67/02* (2013.01); *H04L 67/42* (2013.01)

(58) Field of Classification Search
CPC ..... H04L 65/60; H04L 65/105; H04L 65/602; H04L 67/42; H04L 67/325; H04L 67/2847; H04L 67/02; H04L 67/10
USPC ......... 709/203, 217, 219, 231; 707/758, 624
See application file for complete search history.

(56) References Cited

U.S. PATENT DOCUMENTS

| | | | |
|---|---|---|---|
| 8,621,044 B2 | 12/2013 | Sood et al. | |
| 8,626,870 B2 | 1/2014 | Xu et al. | |
| 8,661,075 B2 | 2/2014 | Smith et al. | |
| 8,677,428 B2 | 3/2014 | Lewis et al. | |
| 8,806,050 B2 | 8/2014 | Chen et al. | |
| 8,849,950 B2 | 9/2014 | Stockhammer et al. | |
| 8,935,363 B2 * | 1/2015 | Zang ................. | H04L 65/4076 709/219 |

(Continued)

OTHER PUBLICATIONS

Akhshabi S, Begen AC, Dovrolis C. An experimental evaluation of rate-adaptation algorithms in adaptive streaming over HTTP. InProceedings of the second annual ACM conference on Multimedia systems Feb. 23, 2011 (pp. 157-168). ACM. (Year: 2011).*

(Continued)

*Primary Examiner* — Ranodhi Serrao
*Assistant Examiner* — James N Fiorillo
(74) *Attorney, Agent, or Firm* — Kilpatrick Townsend & Stockton LLP

(57) ABSTRACT

Methods and apparatus are described for partitioning a manifest file to generate smaller manifest files for media content playback. A server partitions a manifest file prior to receipt of a request from a client or in response to a request from a client for a manifest for media content for a particular temporal range or subset of playback options.

22 Claims, 15 Drawing Sheets

(56) References Cited

U.S. PATENT DOCUMENTS

| | | | |
|---|---|---|---|
| 8,996,547 B2 * | 3/2015 | Bocharov | H04L 29/06027 707/706 |
| 9,125,073 B2 | 9/2015 | Oyman et al. | |
| 9,143,543 B2 | 9/2015 | Falvo | |
| 9,332,051 B2 | 5/2016 | Brueck et al. | |
| 9,338,209 B1 | 5/2016 | Begen et al. | |
| 9,344,472 B2 | 5/2016 | Cheng | |
| 9,532,092 B1 * | 12/2016 | Suryanarayanan | H04N 21/2662 |
| 9,544,388 B1 | 1/2017 | Li et al. | |
| 9,712,860 B1 | 7/2017 | Bordenet et al. | |
| 9,794,360 B1 | 10/2017 | Farhangi et al. | |
| 2012/0042090 A1 * | 2/2012 | Chen | H04L 65/604 709/231 |
| 2012/0096083 A1 | 4/2012 | Teng et al. | |
| 2012/0221741 A1 | 8/2012 | Frojdh et al. | |
| 2012/0259946 A1 * | 10/2012 | Stockhammer | H04L 65/105 709/217 |
| 2012/0317303 A1 | 12/2012 | Wang | |
| 2013/0007223 A1 * | 1/2013 | Luby | H04N 21/23106 709/219 |
| 2013/0173737 A1 * | 7/2013 | Liu | H04N 21/23439 709/213 |
| 2014/0013003 A1 * | 1/2014 | Giladi | H04L 65/60 709/231 |
| 2014/0089398 A1 * | 3/2014 | Zhang | H04N 21/84 709/203 |
| 2014/0189139 A1 * | 7/2014 | Cheng | H04L 65/60 709/231 |
| 2015/0026358 A1 | 1/2015 | Zhang et al. | |
| 2015/0100702 A1 | 4/2015 | Krishna et al. | |
| 2015/0195328 A1 | 7/2015 | Rehan et al. | |
| 2015/0215359 A1 | 7/2015 | Bao et al. | |
| 2015/0237166 A1 | 8/2015 | Denoual et al. | |
| 2015/0312303 A1 * | 10/2015 | Krishna | H04L 65/80 709/219 |
| 2015/0381690 A1 | 12/2015 | Schmidt et al. | |
| 2016/0055225 A1 * | 2/2016 | Xu | G06F 16/27 707/624 |
| 2016/0088054 A1 * | 3/2016 | Hassan | H04L 65/80 709/219 |
| 2016/0094614 A1 | 3/2016 | Ulupinar et al. | |
| 2016/0164943 A1 * | 6/2016 | Walker | H04L 65/601 709/219 |
| 2016/0182593 A1 * | 6/2016 | Denoual | H04L 65/605 709/219 |
| 2016/0198012 A1 * | 7/2016 | Fablet | H04L 65/4084 709/231 |
| 2016/0205158 A1 | 7/2016 | Lo et al. | |
| 2016/0337426 A1 | 11/2016 | Shribman et al. | |
| 2017/0041422 A1 * | 2/2017 | Westphal | H04L 67/2847 |
| 2017/0085616 A1 * | 3/2017 | Botsford | H04L 65/607 |
| 2017/0156015 A1 | 6/2017 | Stockhammer et al. | |
| 2018/0103286 A1 | 4/2018 | Yang et al. | |

OTHER PUBLICATIONS

Lei Li, "Notice &Allowance", U.S. Appl. No. 15/173,499, dated Jun. 28, 2018, 18 pages.

Appelquist , "Virtualization of Video Streaming Functions", Diss. Ph.D. Dissertation. Saarland University, Apr. 26, 2016, 72 pages.

Bouzakaria et al., "Overhead and Performance of Low Latency Live Streaming Using MPEG-DASH", Information, Intelligence, Systems and Applications, IISA 2014, The 5th International Conference, IEEE., Jul. 7, 2014, pp. 92-97.

U.S. Appl. No. 15/173,499 , "Non-Final Office Action", dated Feb. 26, 2018, 38 pages.

Rainer et al., "A Seamless Web Integration of Adaptive HTTP Streaming", InSignal Processing Conference (EUSIPCO), 2012 Proceedings of the 20th European, IEEE, Aug. 27, 2012, pp. 1519-1523.

Seema et al., "WVSNP-DASH: Name-Based Segmented Video Streaming", IEEE Transactions on Broadcasting, vol. 61, No. 3, Sep. 2015, pp. 346-355.

Li, et al., U.S. Appl. No. 15/173,499, filed Jun. 3, 2016, titled Manifest Segmentation.

Li, et al., U.S. Appl. No. 15/173,495, filed Jun. 3, 2016, titled Customized Dash Manifest.

* cited by examiner

MANIFEST PARTITIONING

BACKGROUND

Consumers have an ever-increasing array of options for consuming media content, in terms of the types of media content (e.g., video, audio, text, etc.), providers of the media content, and devices for consuming the media content. Media content providers are becoming increasingly sophisticated and effective at providing media content quickly and reliably to consumers.

Media content (e.g., movies, television shows, videos, music, and electronic books) is often streamed over networks using adaptive bitrate streaming for playback on a viewer's device. Adaptive bitrate streaming includes determining a user's device bandwidth and hardware resources (e.g., available central processing unit (CPU) capacity) in real time and adjusting the quality of the media content that is requested and played back on the user's device to account for changes in the bandwidth and hardware resources. Fragments at different quality levels, or bitrates, of the media content detailed in a manifest file are requested individually and stored in a buffer for playback.

DETAILED DESCRIPTION

Figure 1:
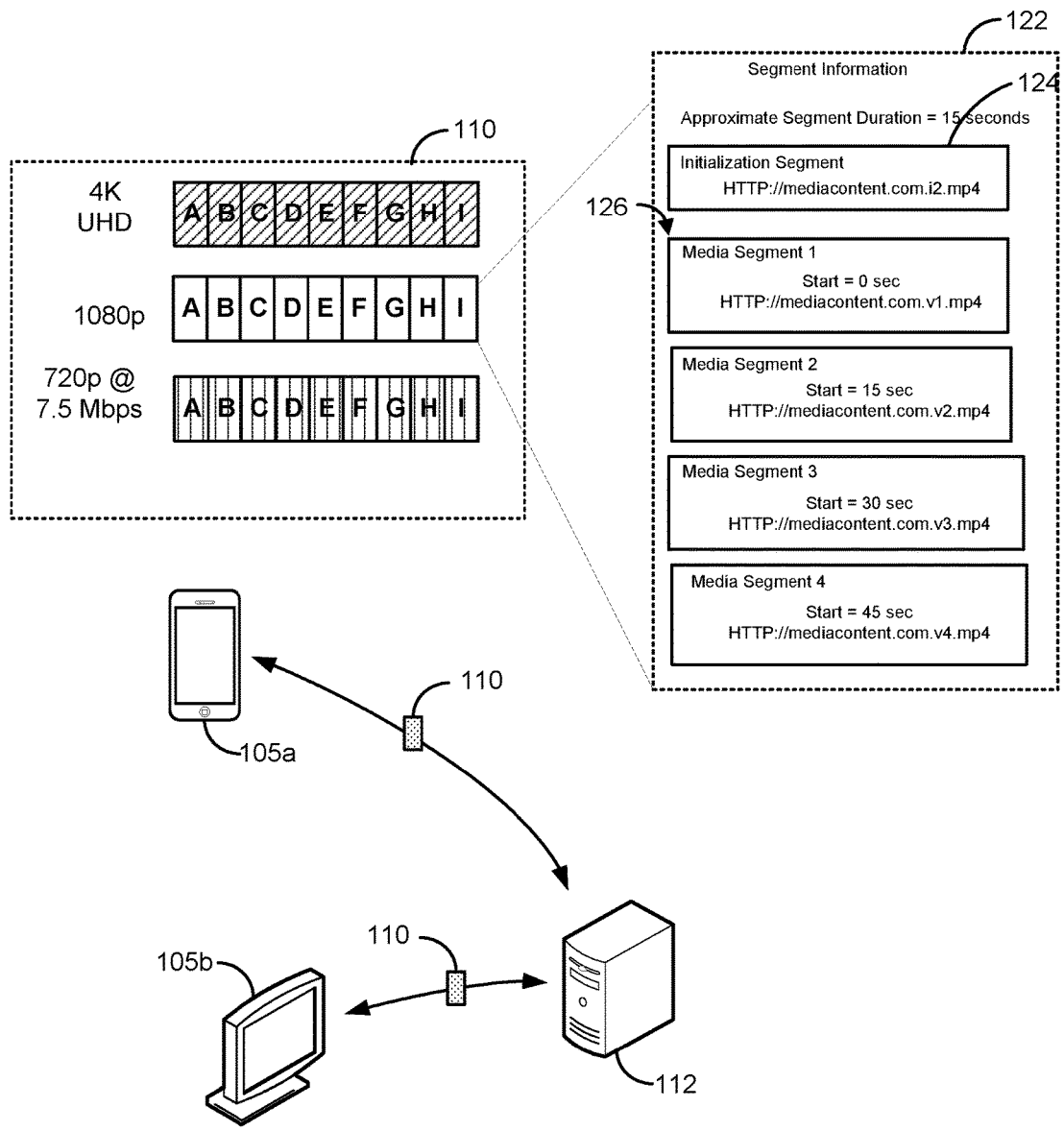
FIG. 1 illustrates an example of a DASH manifest provided for media content playback.

This disclosure describes techniques for implementing static or dynamically generated manifests that include information obtained from initialization fragments of media content files corresponding to different playback options of media content at multiple quality levels. The information obtained from the initialization fragments, also referred to as initialization metadata, is used by a device to initialize its video decoder. When a viewer requests media content (e.g., a movie, a television show, a video, a music track or album, an electronic book, etc.) to stream for playback on a device, the viewer's device uses a manifest file provided by a media server that details fragments, or segments of time, of the media content available at different quality levels. In response to the request for media content, the media server provides a manifest to the viewer device. Since the manifest already includes information obtained from the initialization fragments of the media content file(s), playback of the media content can be initiated by the device without downloading or parsing the initialization fragments as conventionally required, resulting in a reduced time to first frame at the viewer device; an important metric relating to the quality of the user experience. The manifest may also include per-fragment metadata such as per-fragment durations, enabling the viewer device to make fast and precise seeking decisions. Where the request for media content indicates a particular temporal or byte range, the media server may provide a shortened manifest, reducing the amount of memory consumed by the manifest stored at the viewer device. In the following description, a manifest that is generated to include initialization metadata obtained from initialization fragments or additional metadata will be referred to as an enhanced manifest.

In addition, this disclosure describes techniques for segmenting manifests. A manifest such as an enhanced manifest can be segmented prior to receipt of a request from a client device for a manifest or, alternatively, can be segmented in response to the request from the client device. More particularly, the client can request a manifest for a particular fragment range by indicating a particular temporal range (e.g., start time and duration) or range of fragment indices. By providing the client with a segment of a manifest that corresponds to the requested fragment range, the amount of memory consumed by the manifest at the client device can be significantly reduced.

Dynamic Adaptive Streaming over HTTP (DASH), also known as MPEG-DASH, is an adaptive bitrate streaming technique that enables streaming media content to be streamed over the Internet from conventional HTTP servers. In accordance with MPEG-DASH, media content is partitioned into a sequence of small HTTP-based file segments, or fragments, where each segment contains an interval of playback time of the media content. For example, the media content may be a movie, an episode of a television show, or a live broadcast of a sporting event. The media content is made available at a variety of different bitrates in different corresponding sets of segments, where the sets of segments correspond to aligned intervals of playback time. A manifest (e.g., referred to as a Media Presentation Description in ISO/IEC 23009-1) provides information for adaptive streaming of media content by enabling a client device to download media fragments corresponding to the segments from HTTP server(s).

International standard ISO/IEC 23009-1 specifies formats for the manifest and segments for dynamic adaptive streaming of MPEG media over HTTP. FIG. 1 illustrates an example of a DASH manifest provided for media content playback. As shown in FIG. 1, viewer devices 105a and 105b can receive manifest data such as a conventional manifest file 110 from a server 112. Manifest file 110 provides different playback options for media content. The playback options may differ by one or more encoding parameters such as bitrate, resolution, language, codec, etc. In the example of FIG. 1, manifest file 110 indicates fragments for playback of the media content at the 4K UHD, 1080p, and 720p at 5 megabits per second (Mbps) video quality levels (or bitrates). Manifest file 110 includes, for each playback period, for each of the different playback options (e.g., quality levels), segment information 122 for the corresponding playback option. Segment information 122 can include initialization information 124 for an initialization segment of a media content file associated with the corresponding playback option and media segment information 126 for each of the segments (or fragments) of the media content for that period. (An initialization segment will not be present where the corresponding media segments for the playback option are self-initializing.)

The initialization information 124 identifies a location (e.g., Uniform Resource Locator (URL)) of an initialization fragment that contains metadata that can be used by devices to perform initialization for the corresponding playback option for the playback period, while the media segment information 126 describes a corresponding fragment of the media content. The media segment information 126 for each fragment may identify a location of the corresponding media fragment (e.g., URL and byte range), and may also indicate an approximate start time of the corresponding fragment relative to an initial start time of the period of playback of the media content.

The segment information 122 for the corresponding playback option can also indicate an approximate segment duration for playback of fragments of the media content within the period. The DASH standard provides that a duration attribute is optional and, if present, specifies a constant "approximate" duration. In other words, even when present in the DASH manifest, the duration attribute merely specifies an "approximate" duration of the fragment during playback of the media content. In addition, the last segment within the period could be significantly shorter than the other segments within the period. As a result, when a viewer chooses to view a particular portion of the media content such as a specific scene of a movie, the seek time it takes for the viewer device to locate the desired fragment of the media content can be significant.

In addition, to prepare for playback of the media content at the different quality levels, the viewer devices 105a and 105b initialize their respective video decoders using information retrieved from the initialization fragments for the corresponding playback options. More particularly, for each of the playback options (e.g., quality levels), the viewer devices 105a and 105b open and close a Hypertext Transfer Protocol (HTTP) connection, download the initialization fragment, close the HTTP connection, and parse the initialization fragment to extract initialization metadata from the initialization fragment. Where many different quality levels are supported, the time to playback of the first frame in the media content can be substantial.

In accordance with various implementations, a manifest can be statically or dynamically enhanced with additional metadata that reduces the time it takes a client device to initialize its video decoder for playback of the media content, resulting in a reduced time to first frame. More particularly, in accordance with various implementations, initialization metadata can be extracted from initialization fragments of media files corresponding to different playback options. Information including the initialization metadata and/or derived from the initialization metadata can be included directly in the manifest. Initialization metadata can include codec private data, which contains information that is used to decode a stream for the corresponding playback option. Initialization metadata can also include per-fragment metadata. By including per-fragment metadata such as fragment durations directly in the manifest, seeks can be performed more accurately with a reduced seek time.

In one implementation, enhanced manifests are generated according to a segment list format of MPEG-DASH. The segment list format supports a number of features such as a variable group of pictures (GOP) length and variable bitrate (VBR). In addition, the segment list format supports the specification of per-fragment metadata.

Figure 2:
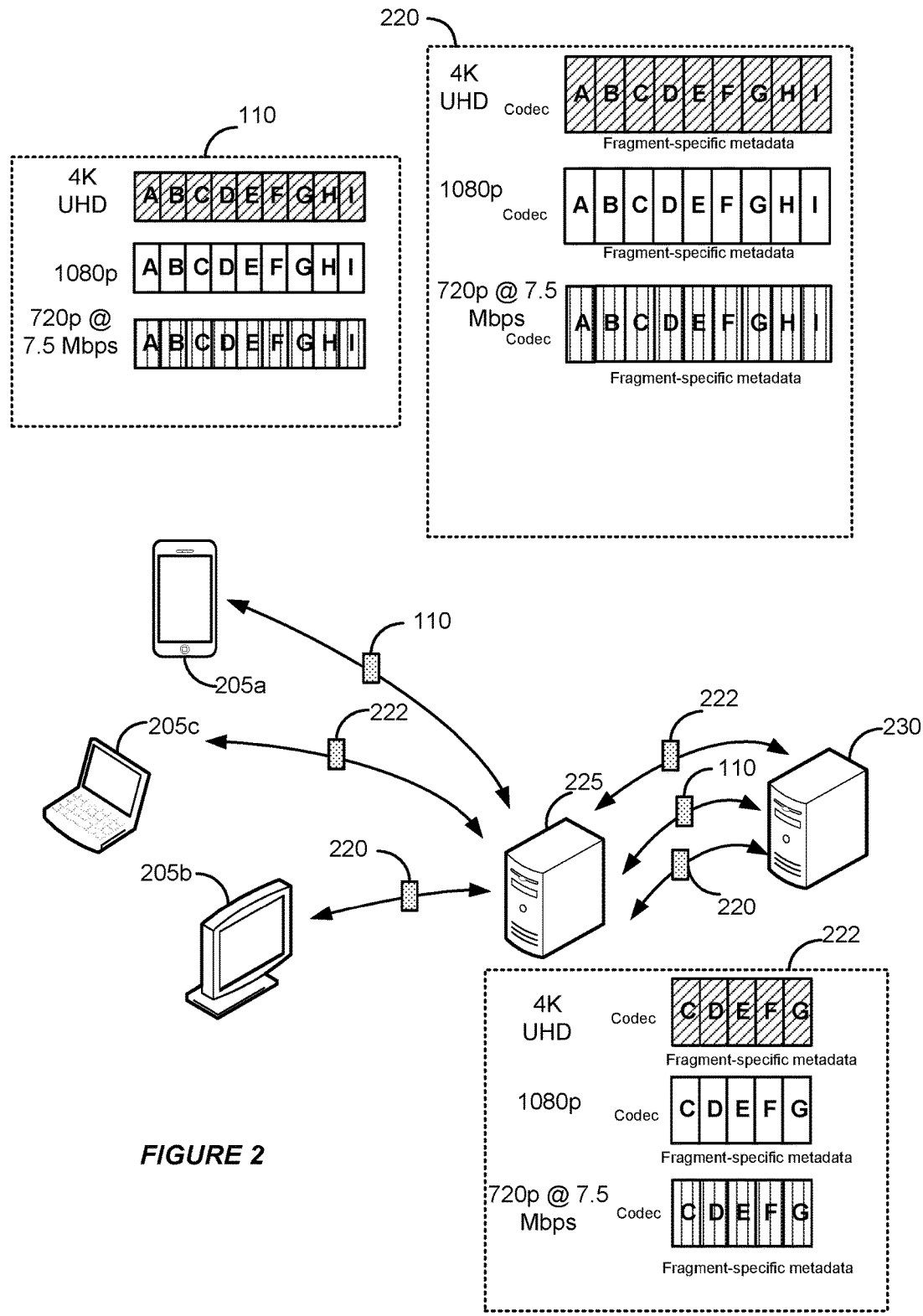
FIG. 2 illustrates an example of a computing environment in which static or dynamic enhanced manifests can be provided for media content playback.

FIG. 2 illustrates an example of a computing environment in which static or dynamically enhanced manifests can be provided for media content playback. As shown in FIG. 2, viewer devices 205a, 205b, and 205c can receive manifest data such as manifest files 110, 220, and 222 (which can be markup files or other types of data structures), respectively, providing playback options for the same media content (e.g., episode #1 of the television show Breaking Bad). Manifest file 110 represents manifest data that includes, for all of the playback periods of the media content, references to locations (e.g., URLs) of initialization fragments corresponding to the different playback options and metadata that enables viewer devices to construct appropriate URLs to access fragments of the media content. Manifest file 220 represents a first enhanced manifest generated from manifest file 110, while manifest file 222 represents a second enhanced manifest that is a subset of manifest file 220. In the depicted implementation, manifest file 220 corresponds to all segments of the media content, while manifest file 222 corresponds to a particular subset of the segments of the media content. For example, manifest file 222 can correspond to a particular temporal or byte range requested by viewer device 205c.

Viewer devices 205a, 205b, and 205c can request playback of the same media content by providing requests to media server 225 to stream the media content for playback on viewer devices 205a, 205b, and 205c. Viewer device 205c includes an additional parameter in its request that requests playback of a specific half hour portion of the media content starting at 12 minutes into the media content.

In this example, viewer device 205a supports only conventional manifests, while viewer devices 205b and 205c support enhanced manifests enabled by the present disclosure. Each of viewer devices 205b and 205c can request an enhanced manifest or opt-in to receive enhanced manifests. Media server 225 can contact manifest server 230 regarding the requests, and manifest files 110, 220, and 222 can be provided by manifest server 230 in communication with media server 225. Alternatively, any of manifest files 110, 220, 222 can be provided independently by media server 225.

An enhanced manifest such as manifest file 220 or 222 can be generated statically or dynamically (e.g., in response to a request from a viewer device), and can be generated by a server such as manifest server 230 or media server 225. In the depicted implementation, manifest files 220 and 222 are generated by manifest server 230.

In the example of FIG. 2, manifest file 110 indicates all of the fragments A-I for playback of the media content at the 4K UHD, 1080p, and 720p at 5 megabits per second (Mbps) video quality levels (or bitrates). That is, manifest file 110 provides fragments for encodings of the media content at three different quality levels. More particularly, manifest file 110 indicates how to request and play back fragments A-I at the 720p at 4K UHD, 1080p, and 720p at 5 megabits per second (Mbps) video quality levels.

Manifest server 230 can generate manifest file 220 from manifest file 110 and initialization metadata obtained from initialization fragments of media files corresponding to the three different quality levels. More particularly, initialization fragments (for all playback periods) can be accessed via URLs or other location data contained in manifest file 110. Thus, manifest file 220 indicates that all of the fragments A-I of the media content can be requested at the 4K UHD, 1080p, and 720p at 5 megabits per second (Mbps) video quality levels. In other words, manifest file 220 indicates how to request and play back fragments A-I at the 720p at 4K UHD, 1080p, and 720p at 5 megabits per second (Mbps) video quality levels. In addition, manifest file 220 includes initialization metadata. In the depicted implementation, the initialization metadata includes codec private data, as well as per-fragment metadata for each of the fragments A-I. For example, the per-fragment metadata can include a fragment duration, fragment byte range, and/or fragment quality level.

Manifest server 230 can generate manifest file 222 indicating that a subset of the segments of the media content can be requested at the 4K ultra-high-definition (UHD), 1080p, and 720p at 5 Mbps quality levels. More particularly, manifest file 222 indicates that fragments C-G of the fragments A-I are available for playback at the 4K ultra-high-definition (UHD), 1080p, and 720p at 5 Mbps quality levels. Thus, manifest file 222 indicates how to request and play back fragments C-G at the 720p at 4K UHD, 1080p, and 720p at 5 megabits per second (Mbps) video quality levels. In addition, manifest file 222 also includes initialization metadata. In the depicted implementation, the initialization metadata includes codec private data, as well as per-fragment metadata for each of the fragments C-G.

Manifest files 110, 220, and 222 can be provided to viewer devices 205a, 205b, and 205c, respectively, by media server 225. As a result, viewer device 205a can request all of the fragments A-I at the 4K ultra-high-definition (UHD), 1080p, and 720p at 5 Mbps quality levels for playback of the media content since those are the fragments and quality levels provided in manifest 110. Viewer device 205b can request all of the fragments A-I at the 4K UHD, 1080p, and 720p at 5 Mbps quality levels for playback of the same media content since those are the fragments and quality levels provided in manifest 220. Viewer device 205c can request fragments C-G at the 4K UHD, 1080p, and 720p at 5 Mbps quality levels for playback of the same media content since those are the fragments and quality levels provided in manifest 222. In the depicted implementation, viewer devices 205b and 205c are configured to parse enhanced manifest files. To initialize their video decoders for playback of the media content, viewer devices 205b and 205c process initialization metadata that is contained within the enhanced manifest files 220 and 222, respectively. The viewer devices 205b and 205c may initiate playback of the media content without downloading or parsing initialization fragments from media files corresponding to the 4K UHD, 1080p, and 720p at 5 Mbps quality levels. In contrast, to initialize its video decoder for playback of the media content, viewer device 205a downloads and parses initialization fragments from media files corresponding to the 4K UHD, 1080p, and 720p at 5 Mbps quality levels via separate HTTP connections. As a result, the time to first frame for viewer device 205a is significantly greater than that for viewer devices 205b and 205c.

In more detail, when viewer devices 205a, 205b, and 205c indicate that streaming of media content is to begin, a request can be provided to media server 225 to provide a manifest file indicating fragments, or segments, of the playback of the media content corresponding to different playback options. Media server 225 provides manifest files 110, 220, and 225 to devices 205a, 205b, and 205c, respectively. Each manifest file includes metadata that allows the viewer device to generate properly formatted requests for specific fragments of the media content. A sequence of fragments together can provide playback of the full media content as depicted at 110 and 220 or, alternatively, can provide playback of a subset of the media content as depicted at 222. Audio portions of the media content can also be provided in fragments. Additional information, such as available subtitles, can also be provided in the manifest file.

Viewer devices 205a, 205b, and 205c can implement heuristic algorithms to determine the quality level of the fragments of the media content to request to provide streaming playback of the media content based on manifest files 110, 220, and 222, respectively. For example, viewer device 205a might be a smartphone running an operating system or software application utilizing a heuristic algorithm that determines which quality level to select fragments at based on information such as the bandwidth of the Internet connection (or other network connection) that viewer device 205a uses to communicate with media server 225 and the hardware resources, such as the central processing unit (CPU) availability or capacity. As the available bandwidth increases and/or CPU availability increases, the heuristic algorithm can request higher-quality fragments of the media content for playback by parsing the manifest file and selecting higher-quality fragments for requests. As the available bandwidth decreases and/or CPU availability decreases, then lower-quality fragments of the media content can be requested for playback. As a result, viewer device 205a determines which fragments to select and request from media server 225 to provide playback of the media content by using the data in manifest file 110. Viewer device 205c might be a laptop computer implementing the same or a different heuristic algorithm for selecting fragments of the media content for playback by using the data in manifest file 222. Similarly, viewer device 205b might be a smart television implementing the same or a different heuristic algorithm for selecting fragments of the media content for playback by using the data in manifest file 220.

Media server 225 can be an edge server of a content delivery network (CDN). Media server 225 can provide fragments of the media content for streaming playback on viewer devices 205a, 205, and 205c, as well as receive fragments from other components of the CDN (e.g., origin servers). In FIG. 2, media server 225 can communicate with manifest server 230, which can be an application server that can be part of or external to the CDN. In some implementations, the functionality of both media server 225 and manifest server 230 can be implemented within the same server, both within the same CDN, or across several servers. Media server 225 can provide information regarding viewer devices 205a. 205b, and 205c making the requests for the manifest files to manifest server 230, and manifest server 230 can use this information to retrieve or generate manifest files 110, 220, and 222.

Manifest server 230 can include information that can be used to retrieve or generate manifest files 110, 220, and 222 for viewer devices 205a, 205b, and 205c, respectively. Additionally, manifest server 230 can use information provided by media server 225 to determine the metadata to include in manifest files 220 and 222. Information maintained at manifest server 230 or provided by media server 225 to manifest server 230 can include or be derived, at least in part, from one or more of the following: metadata pertaining to the media content, request-specific information, and/or device profiles of viewer devices 205a, 205b, 205c.

Metadata pertaining to the media content can include manifest data, which includes references to locations (e.g., URLs and/or byte ranges) at which media and initialization fragments corresponding to the different playback options (e.g., quality levels) can be accessed.

Request-specific information can include or be derived from parameter(s) of a request for media content transmitted by a viewer device. For example, parameters can include an indication that a viewer device is configured to support enhanced manifests, an indication that the viewer device is requesting an enhanced manifest for the specific media content, and/or an indication that the viewer device is interested in a particular temporal or byte range of the media content.

In the depicted implementation, since viewer devices 205b and 205c each support enhanced manifests, viewer devices 205b and 205c can transmit requests that include a first parameter that requests an enhanced manifest for the media content. Viewer device 205c can also provide a second parameter in its request, where the second parameter indicates a fragment range corresponding to a subset of the media fragments of the media content. For example, the fragment range can be requested in the form of a temporal range (e.g., indicated via a start time and time duration) or a byte range (e.g., indicated via a range of fragment indices).

Device profiles of viewer devices 205a, 205b, and 205c can indicate device characteristics such as hardware and/or software capabilities. For example, device characteristics can include, but are not limited to, device type (e.g., smartphone, laptop computer, tablet, HD television), screen size or resolution, operating system, and/or memory capacity. Software capabilities can include, for example, operating system type, operating system version, and/or manifest processing configuration (e.g., whether the device is capable of parsing enhanced manifests).

Device profiles of viewer devices 205a, 205b, and 205c can also indicate device manifest preferences. For example, a device profile of device 205b can indicate that device 205b has opted-in to receive enhanced manifests. Later, when device 205b opts out of receiving enhanced manifests, the device profile can be updated by a server such as manifest server 230. As another example, a device profile of device 205c can indicate that device 205c has requested an enhanced manifest for the media content (e.g., for a specific request) by providing an indication in its request for the media content.

In the depicted implementation, manifest server 230 can be provided a request from media server 225 to retrieve or dynamically generate manifest files corresponding to the requests received from viewer devices 205a, 205b, and 205c to stream the media content. Media server 225 might provide the title, cache key, and/or other type of identifier of the media content to manifest server 230. Manifest server 230 can include metadata such as manifest file 110 indicating the fragments for playback of the video portion of the media content at the 4K UHD, 1080p, 720p at 5 Mbps, and 720p at 7.5 Mbps quality levels.

Since viewer device 205a supports only conventional manifest files, manifest server 230 can retrieve manifest file 110 and provide manifest file 110 to media server 225 to provide to viewer device 205a. Manifest server 230 can determine that viewer device 205b supports enhanced manifest files, and retrieve enhanced manifest file 220 or generate enhanced manifest file 220 from manifest file 110. Viewer device 205c has indicated that it is interested in viewing a half hour of playback time starting at 12 minutes into the media content. Manifest server 230 can determine that viewer device 205c supports enhanced manifest files, and retrieve or generate manifest file 222 that contains metadata pertaining to playback of the requested portion of the media content.

Manifest server 230 can segment enhanced manifest file 220 either prior to receiving a request from media server 225 or dynamically in response to receiving the request. More particularly, manifest server 230 can segment enhanced manifest file 220 along half hour or hour boundaries, and save the portions of manifest file 220 as separate manifests. Alternatively, manifest server 230 can dynamically generate manifest file 222 by obtaining a portion of manifest file 220 pertaining to playback of the requested half hour of media content, which corresponds to fragments C-G of the media content at the different quality levels. For example, each fragment can correspond to 6 minutes of playback content. In the implementation depicted in FIG. 2, missing fragments A-B and H-I cannot be requested by viewer device 205c using manifest file 222 because the requests for them cannot be properly made due to them not being included in manifest file 222. In other implementations, manifest server 230 can retrieve a manifest file that corresponds to a greater period of time (e.g., an hour) than that requested (e.g., a half hour), but is still a much smaller file than manifest file 220.

Figure 3:
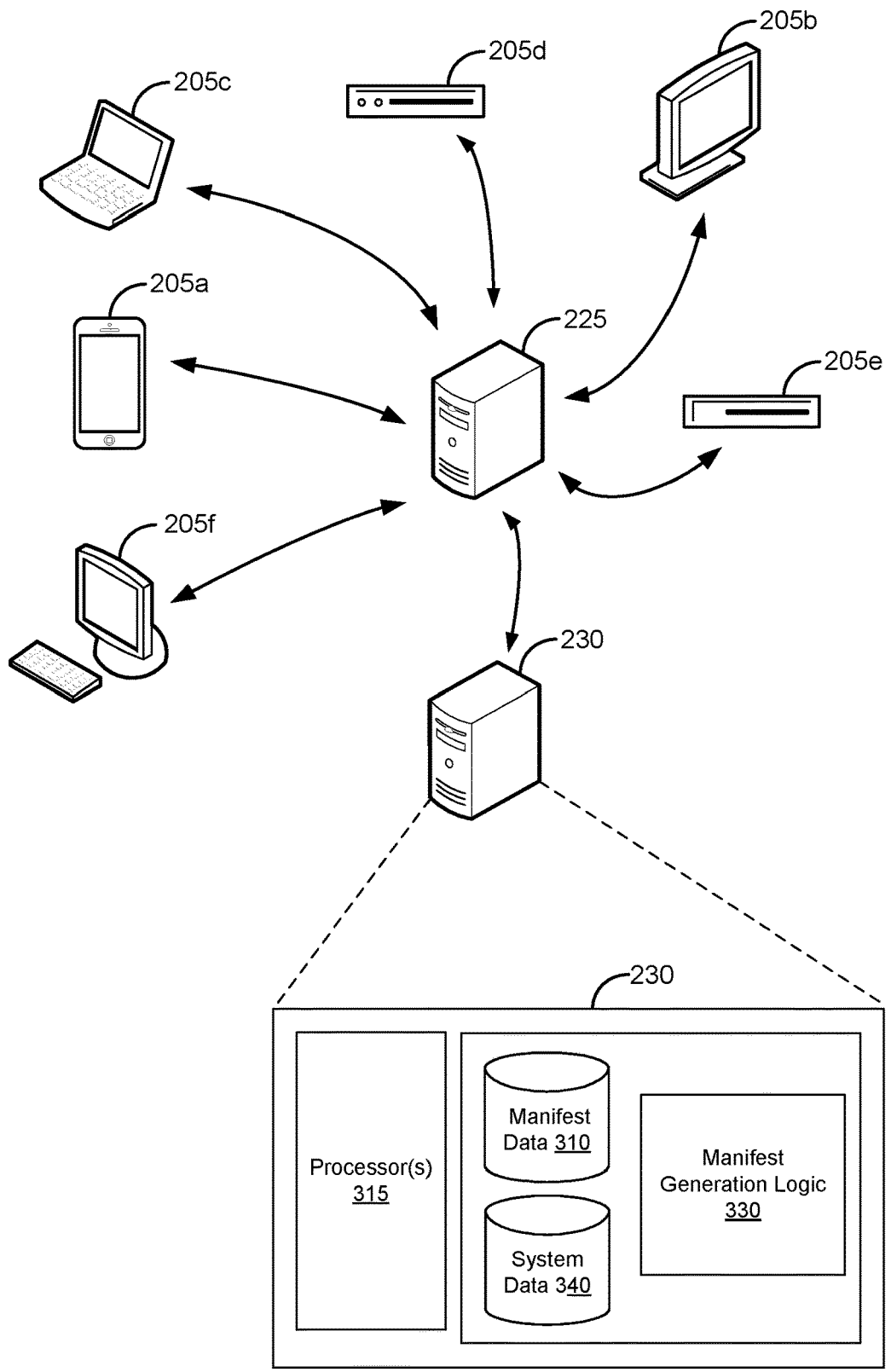
FIG. 3 illustrates an example of a computing environment in which enhanced manifests can be used for media content playback.

FIG. 3 illustrates an example of a computing environment in which enhanced manifests can be used for media content playback. The computing environment of FIG. 3 includes media server 225 which can be used to provide media content for playback on viewer devices 205a-e. Viewer device 205a is a smartphone, viewer device 205b is a television, viewer device 205c is a laptop computer, viewer device 205d is a set-top box, viewer device 105e is a video game console, and viewer device 205f is a desktop computer. Other types of devices such as tablets, wearable devices (e.g., smart watches), virtual reality headsets, etc. may also be included in the computing environment.

It should be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

Media server 225 and/or manifest server 230 may be part of a content delivery system that conforms to any of a wide variety of architectures. The functionality and components of media server 225 and manifest server 230 can use one or more servers and be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Multiple entities may be involved in the delivery of media content and data related to the media content, including content providers, internet service providers (ISPs), providers of content delivery networks (CDNs), etc. The functionality described herein also may be implemented by one or more of different entities. For example, the functionality to provide playback of media content can be integrated into a video player or software client under control of one entity (e.g., on viewer devices 205a-e), integrated into a separate app from another entity, implemented in an edge server or content server of a CDN, a server of an ISP, etc.

Media server 225 can include various types of logic used to provide media content for playback at viewer devices 205a-f. In FIG. 3, media server can include media content storage for storing fragments of media content and playback handling logic to provide fragments to viewer devices 205a-f.

In addition, manifest server 230 can include various types of logic used to retrieve and/or generate manifest files for facilitating the playback of media content by viewer devices 205a-f. Manifest server 230 also can include one or more processors 315, memory, and other hardware for performing the tasks disclosed herein. Media server 225 and viewer devices 205a-f can also include processors, memory, and other hardware.

Manifest generation logic 330 can use data including manifest data 310, system data 340, and/or enhanced manifest data 220 to statically or dynamically generate manifest files that can be provided to viewer devices 205a-f for playback of media content. Manifest data 310 can include data including details regarding fragments of the video portion of the playback for media content, details regarding fragments of the audio portion of the playback for media content, subtitles, and/or other types of data related to the playback of media content for different playback options. For example, manifest data 310 can include URLs and/or byte ranges associated with media fragments including video fragments and/or audio fragments. System data 240 can include data regarding device profiles (e.g., device characteristics, manifest preferences) and other types of data described herein that can be used to retrieve or generate an appropriate manifest.

Referring back to FIG. 1 and FIG. 2, manifest server 330 may determine based, at least in part, on the system data, whether to provide conventional manifest 110 corresponding to the requested media content, retrieve or generate enhanced manifest 220 corresponding to the requested media content, or retrieve or generate manifest 222 including only a portion of enhanced manifest 220. In accordance with one implementation, segmentation of an enhanced manifest file 220 to generate further "partial" enhanced manifests can be performed statically or dynamically (e.g., in response to viewer device requests), as will be described in further detail below. In some implementations, the data within system data 340 can be dynamic and changing through time and may be provided from a variety of sources. For example, the system data 340 can include request-specific information.

In further detail, referring back to FIG. 1 and FIG. 2, manifest generation logic 330 of manifest server 230 can generate enhanced manifest 220 by identifying locations of initialization fragments of media content files corresponding to the different playback options (e.g., quality levels), downloading the initialization fragments, at least partially parsing the initialization fragments to extract initialization metadata, and generating enhanced manifest file 220 based, at least in part, on manifest data 310 and the extracted initialization metadata. More particularly, enhanced manifest 220 can be generated to include at least a portion of manifest data 310, as well as information including and/or derived from at least a portion of the initialization metadata. Moreover, manifest generation logic 330 of manifest server 230 can generate enhanced manifest 222 by segmenting manifest 220, either statically or dynamically along temporal or byte range boundaries, which may be indicated by viewer device 205c.

In one implementation, manifest data 310 or initialization metadata includes per-fragment quality values. Each quality value is an objective measure of the visual quality of that fragment. The quality value associated with a fragment may be determined based upon characteristics of the fragment, as will be described in further detail below.

Each fragment can be represented by a set of parameters that can be used to determine its associated quality value. The set of parameters can include parameters associated with the fragment and/or its constituent frames. For video fragments, such frame parameters might include, for example, quantization parameters, rate factors, frame size, frame type, what portion of a frame is intra versus predicted, the degree of motion in a frame, whether a frame is black, whether a frame is part of a fade, peak signal-to-noise ratio (PSNR), a codec's internal metric(s) (e.g., Rate Factor in x264 and x265), relative and absolute number of bits spent on intra prediction, motion vectors, residual coding, chroma information, luma information, spatial and temporal frequency distribution, what other frames such frames reference, what frames they are referenced by, position in the fragment, position in a scene, if a frame starts or ends a fragment, Structural Similarity (SSIM), Motion-based Video Integrity Evaluation (MOVIE) index, Tektronix PQA, etc. For audio fragments, such parameters might include, for example, quantization parameters, PSNR, Perceptual Evaluation of Audio Quality (PEAQ), etc. A parameter for a given fragment or group of fragments may not necessarily be derived from its constituent frames but may be any information by which the fragment can be reliably compared and classified in a manner that is predictive of perceived quality.

Figure 4:
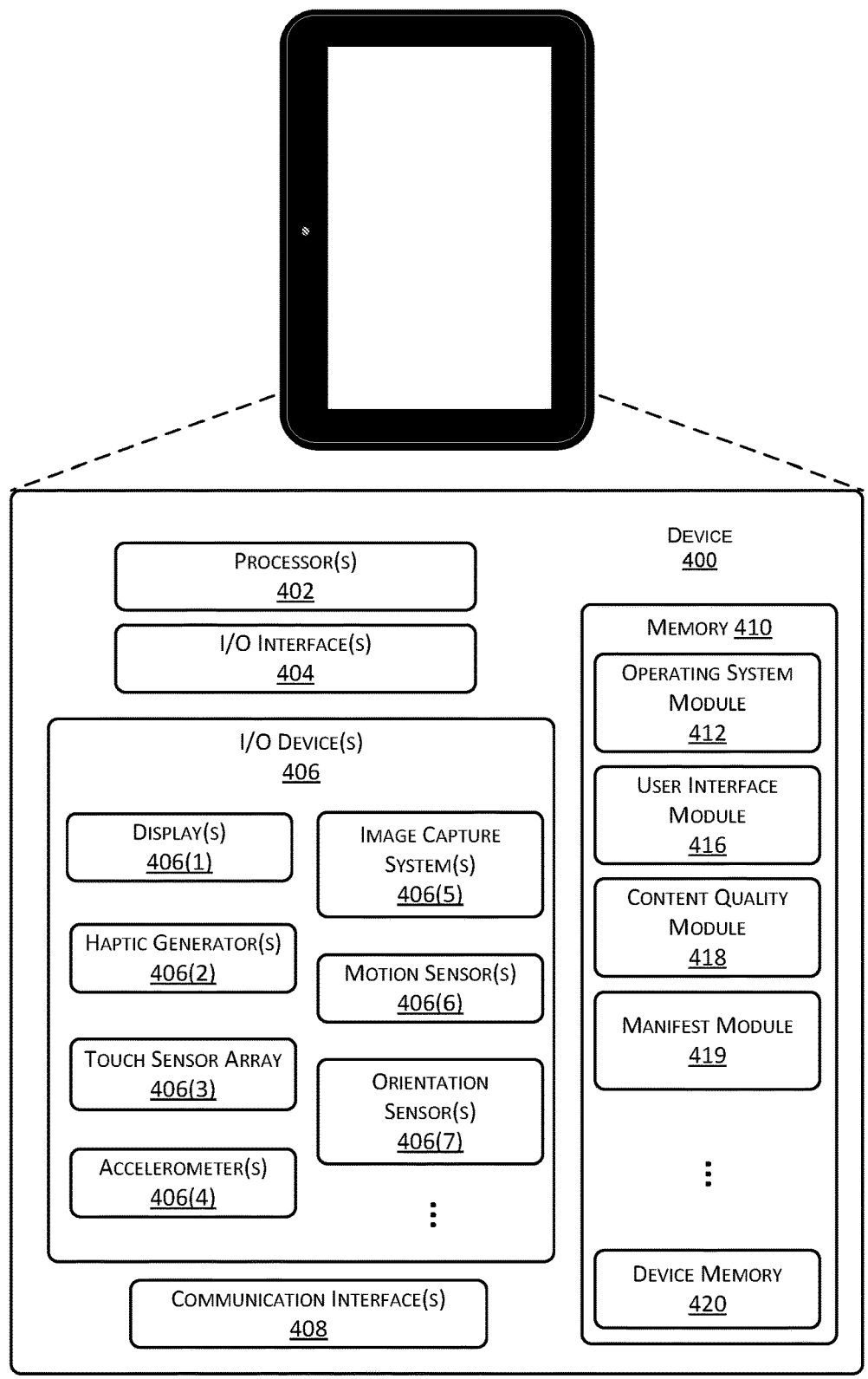
FIG. 4 is a simplified block diagram illustrating an electronic device that may be employed with various implementations.

FIG. 4 is a simplified block diagram illustrating an electronic device that may be employed with various implementations. Device 400 includes one or more single or multi-core processors 402 configured to execute stored instructions (e.g., in device memory 410). Device 400 may also include one or more input/output (I/O) interface(s) 404 to allow the device to communicate with other devices. I/O interfaces 404 may include, for example, an inter-integrated circuit (I2C) interface, a serial peripheral interface (SPI) bus, a universal serial bus (USB), an RS-232 interface, a media device interface, and so forth. I/O interface(s) 404 is coupled to one or more I/O devices 406. The I/O device(s) 406 may include one or more displays 406(1), one or more haptic generators 06(2), a touch sensor array 406(3), one or more accelerometers 206(4), one or more image capture systems 206(5), one or more motion sensors 406(6), one or more orientation sensors 406(7), microphones, speakers, and so forth. The one or more displays 406(1) are configured to provide visual output to the user and may comprise any of a variety of display types including, for example, any type of reflective or transmissive display. Touch sensor array 406(3) may be a capacitive sensor array having a matrix of conductors that are scanned to determine, for example, the location, duration, speed and direction of touch events within the matrix based on changes in electrical capacitance.

Device 400 may also include one or more communication interfaces 408 configured to provide communications between the device and other devices. Such communication interface(s) 408 may be used to connect to cellular networks, personal area networks (PANs), local area networks (LANs), wide area networks (WANs), and so forth. For example, communications interfaces 408 may include radio frequency modules for a 3G or 4G cellular network, a WiFi LAN and a Bluetooth PAN. Device 400 also includes one or more buses or other internal communications hardware or software that allow for the transfer of data and instructions between the various modules and components of the device.

Device 400 also includes one or more memories (e.g., memory 410). Memory 410 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 410 provides storage for computer readable instructions, data structures, program modules and other data for the operation of device 400. Memory 410 includes at least one operating system (OS) module 412 configured to manage hardware resources such as I/O interfaces 404 and provide various services to applications or modules executing on processor(s) 402. Memory 410 also includes a user interface module 416, a content rendering module 418, manifest module 419, and other modules.

Manifest module 419 may be configured to parse manifests received from media server. More particularly, device 400 may be configured to parse conventional manifests and/or enhanced manifests. For example, where an enhanced manifest is not available, device 402 may be configured to recognize and parse a conventional manifest. Parsing of an enhanced manifest and playback of the media content may be performed without downloading or parsing initialization fragments corresponding to the different playback options. Furthermore, device 400 need not open (and close) HTTP connections to access the initialization fragments.

In addition, manifest module 419 may be configured to compose and transmit a request to a media server (e.g., edge server) for media content. Manifest module 419 may enable device 402 to request an enhanced manifest for the media content by providing an indication in the request for media content. The request may also include one or more additional parameters such as an indication of a desired fragment range. Similarly, manifest module 419 may enable device 402 to opt-in or out of receiving enhanced manifests (e.g., for media content that is subsequently requested by device 400) by providing an indication in the request for media content or transmitting a separate message to media server or another server.

Content quality module 418 may be configured to select fragments for playback from a manifest based upon factors such as available hardware resources (e.g., memory and/or CPU), current bandwidth, and/or per-fragment quality values within the manifest. Selected fragments may be downloaded for playback via device 402. An example process of switching bitrates and fragment selection during adaptive bit rate streaming will be described in further detail below with reference to FIG. 10.

Memory 410 also includes device memory 420 to store a wide variety of instructions and information using any of a variety of formats including, for example, flat files, databases, linked lists, trees, or other data structures. Such information includes content for rendering and displaying on display 406(1) including, for example, any type of video content. In some implementations, a portion of device memory 420 may be distributed across one or more other devices including servers, network attached storage devices, and so forth.

The logic or computer program instructions used to support the processing of manifests (represented by manifest module 419) may be implemented in a variety of ways. For example, at least some of this functionality may be implemented as part of the code of a video decoder and/or media player operating on device 400. And as mentioned above, implementations are contemplated in which at least a portion of the logic or computer program instructions may reside on a separate platform, e.g., media server 225, manifest server 230, etc. Suitable variations and alternatives will be apparent to those of skill in the art. It will also be understood that device 400 of FIG. 4 is merely an example of a device with which various implementations of the present invention may be practiced, and that a wide variety of other devices types may also be used (e.g., devices 205-a to 205-f). The scope of the invention should therefore not be limited by reference to device-specific details.

Figure 5:
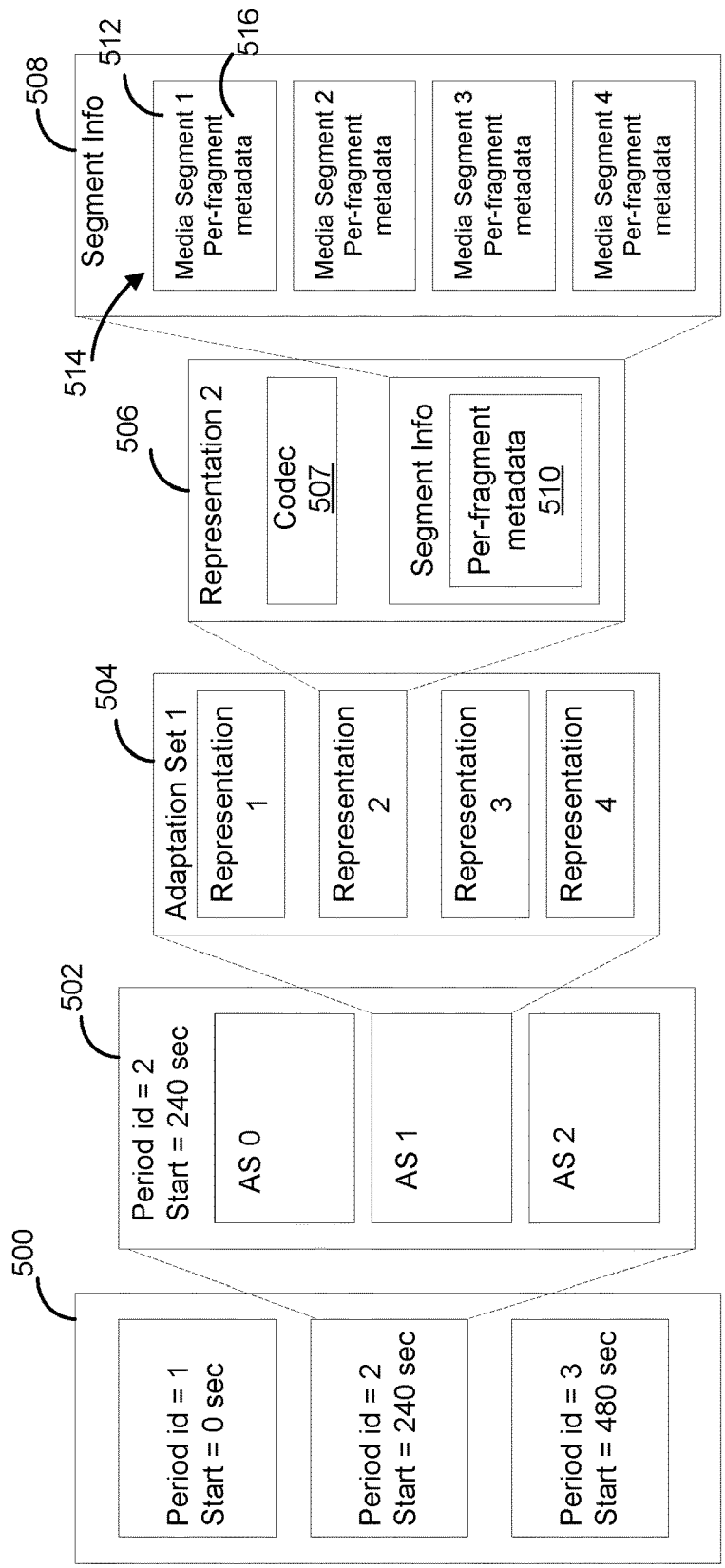
FIG. 5 illustrates an example of a format of an enhanced manifest for media content playback.

FIG. 5 illustrates an example of a format of an enhanced manifest for media content playback. Enhanced manifest 500 can include metadata for a plurality of periods of playback time of media content. In the example depicted in FIG. 5, manifest 500 includes metadata for three different periods. For each period 502, different playback options are represented as one or more adaptation sets 504, where each adaptation set 504 includes metadata for a plurality of representations 506. Each of the representations 506 corresponds to a different one of a plurality of playback options. More particularly, metadata associated with representation 506 enables the media content to be played back via fragments of a media file associated with the corresponding playback option.

In the implementation depicted in FIG. 5, manifest 500 includes, for each representation 506, a codec private data attribute 507 that includes codec private data for the representation. Codec private data includes parameters that are used by a client device to initialize its video decoder to decode a video stream for the corresponding representation 506. For example, codec private data can include High Efficiency Video Coding (HEVC) parameters that are used to decode a video stream encoded by an HEVC/H.265 encoder. HEVC parameters generally include a video parameter set (VPS), a sequence parameter set (SPS), and a picture parameter set (PPS). Codec private data can be represented as a single string or multiple strings.

In addition, segment information 508 for representation 506 includes per-fragment metadata 510 for each of the fragments. Per-fragment 510 metadata can include, but is not limited to, per-fragment duration, per-fragment byte-range, and/or per-fragment quality value. A per-fragment quality value is representative of the visual quality of the fragment as it will be perceived by a viewer. An example of processing per-fragment quality values will be described below with reference to FIG. 10.

As shown in this example, per-fragment metadata 510 can be provided separately for each media segment 512 within segment list 514, as shown at 516. For example, per-fragment metadata 516 can include a quality value that is provided in association with a byte range for the corresponding fragment. An example format for presentation of a quality value is as follows:
<SegmentURL mediarange="20418-28795" q="125"/>

Figure 6:
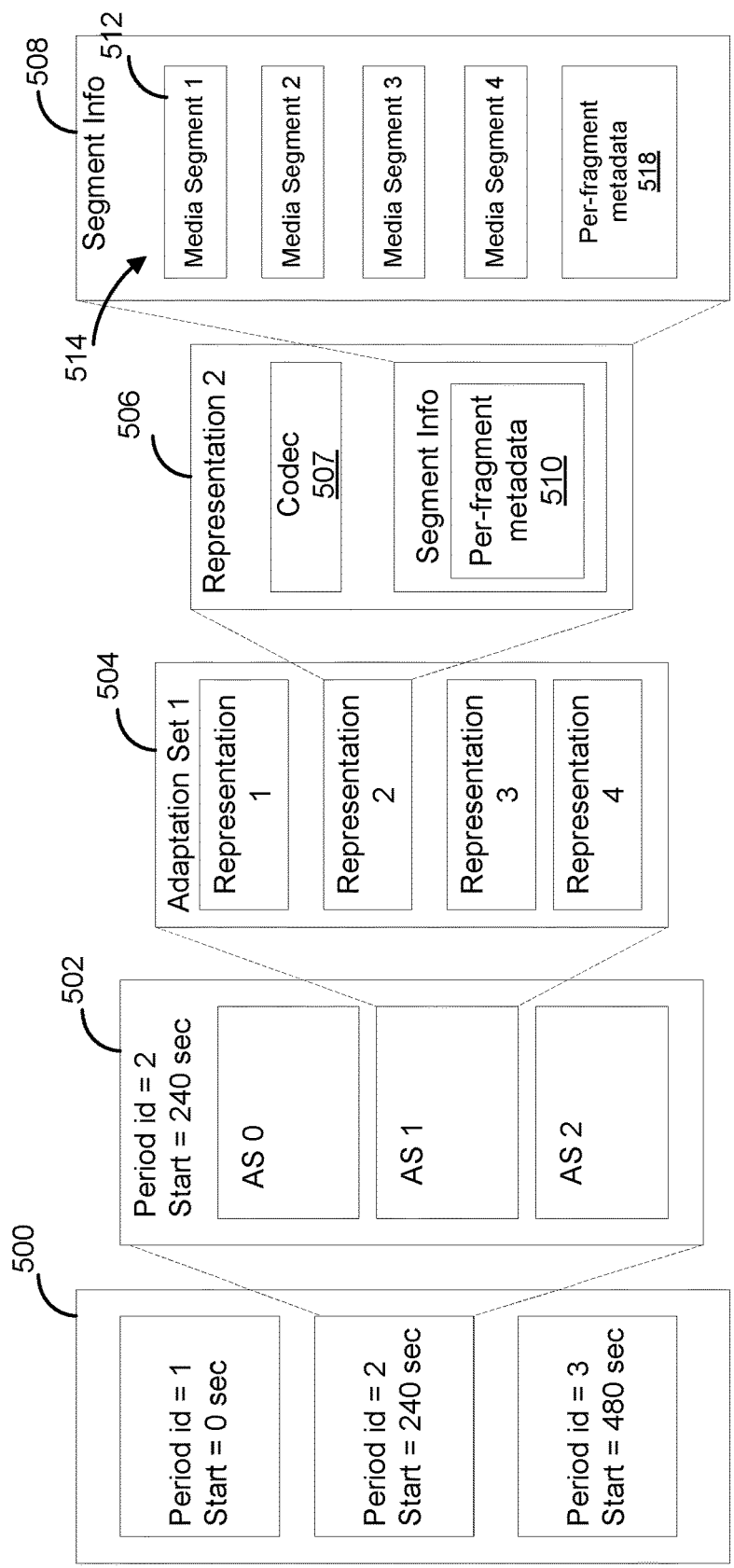
FIG. 6 illustrates an example of a second format of an enhanced manifest for media content playback.

FIG. 6 illustrates an example of a second format of an enhanced manifest for media content playback. In the implementation depicted in FIG. 6, per-fragment metadata 510 for representation 506 is provided for fragments corresponding to media segments 512 in a single section 518 for representation 506. In other words, per-fragment metadata for multiple media segments 512 can be consolidated in section 518 rather than provided separately, as shown in FIG. 5. For example, section 518 can include segment durations and/or byte ranges for each segment of representation 506. In one implementation, section 518 contains media segment byte ranges for representation 506. While section 518 is shown in the implementation depicted in FIG. 6 to be at the end of the code segment for representation 506, section 518 can also be provided at the beginning of the code segment for representation 506 or another location.

Figure 7:
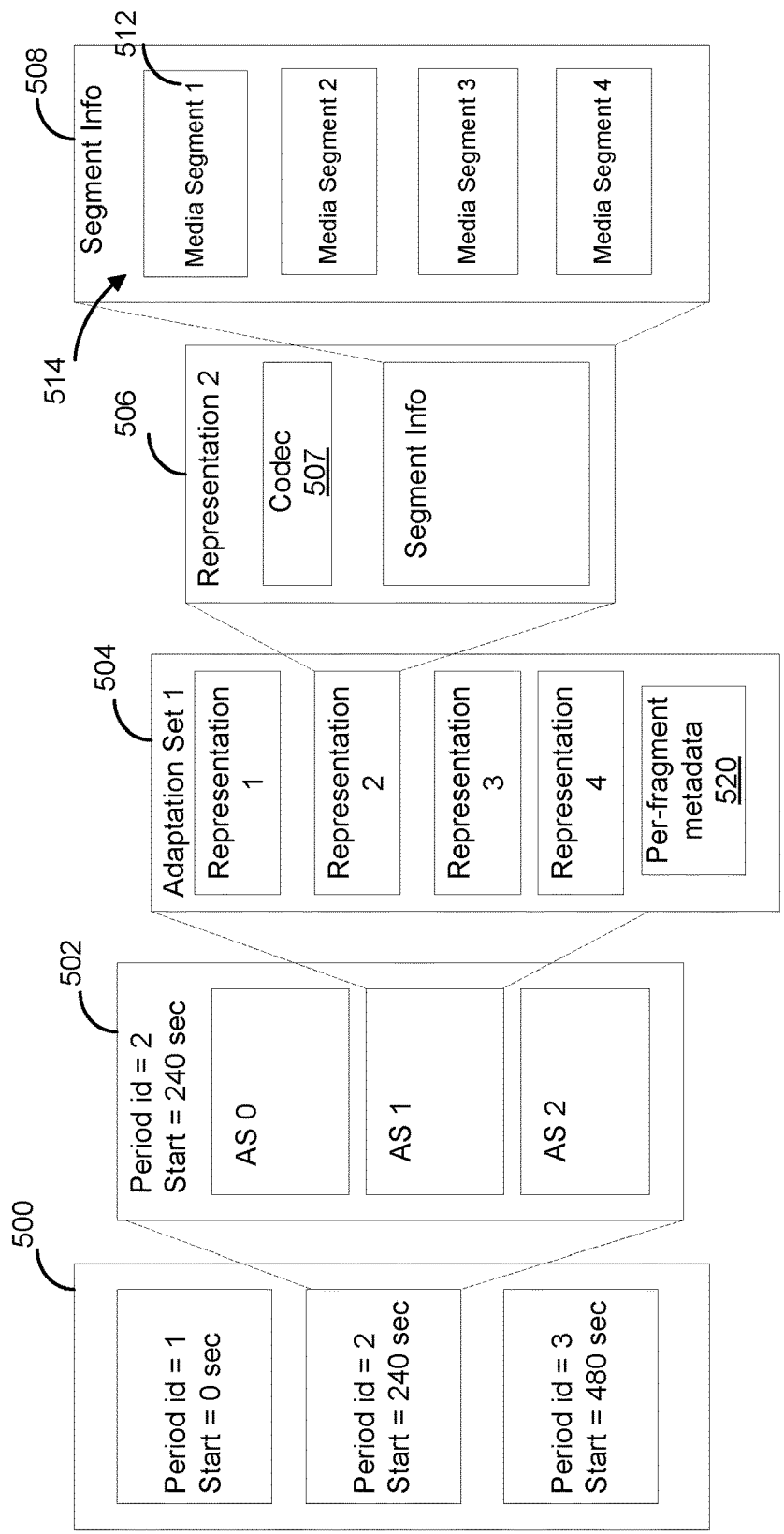
FIG. 7 illustrates an example of a third format of an enhanced manifest for media content playback.

FIG. 7 illustrates an example of a third format of an enhanced manifest for media content playback. In the implementation depicted in FIG. 7, per-fragment metadata 520 is provided for each adaptation set 504. For example, per-fragment metadata 520 can include segment durations and/or byte ranges for each segment of adaptation set 504. In one implementation, per-fragment metadata in per-fragment metadata 520 includes a segment duration for each segment of adaptation set 504. While per-fragment metadata 520 is shown to be located at the end of the code segment for adaptation set 504, per-fragment metadata 520 may also be located at the beginning of the code segment for adaptation set 504 or another location.

As shown in the implementation depicted in FIG. 7, per-fragment metadata 520 can include a segment duration for each segment of the period. In addition, per-fragment metadata 520 can include a timescale attribute that can be used to translate a segment duration of the adaptation set into seconds. An example format for presentation of a segment durations element is as follows:

<SegmentDurations> timescale="30000">
  <s d="60060"/>
  <s d="60060"/>
  <s d="60060"/>
  <s d="60060"/>
</SegmentDurations>

In this example, the segment duration 60060 can be translated into seconds using the timescale 30000.

Referring back to FIGS. 5-7, codec private data can be provided for each representation 506 (for each adaptation set 504 of each period 502 of manifest 500). In one implementation, segment durations are provided per adaptation set 504 at a portion of manifest 500 such as that shown at 520 of FIG. 7, while media segment byte ranges are provided per representation 506 at portion(s) of manifest 500 such as shown at 516 of FIG. 5 or 518 of FIG. 6. For example, segment durations can be provided at the end of a segment of code for adaptation set 504 as shown at 520 of FIG. 7 or, alternatively, segment durations can be provided at the beginning of the segment of code for adaptation set 504. As another example, media segment byte ranges for each representation 506 can be provided within corresponding segment list 514 as shown in FIG. 5 or external to segment list 514 as shown in FIG. 6.

By generating an enhanced manifest, the complexity and size of the manifest can increase substantially. As a result, the amount of memory of a client device consumed by an enhanced manifest can be significantly greater than a conventional manifest. Similarly, the amount of time spent by a client device parsing an enhanced manifest can be significant.

In accordance with various implementations, the size and complexity of an enhanced manifest can be reduced by using an optimized format. More particularly, the optimized format can aggregate per-fragment metadata pertaining to a plurality of segment durations in an aggregated segment duration portion of manifest 500 and aggregate per-fragment metadata pertaining to a plurality of fragment byte ranges in an aggregated byte range portion of manifest 500. For example, an aggregated segment duration portion may be generated for each adaptation set as shown at 520 of FIG. 7, while an aggregated byte range portion may be provided for each representation as shown at 518 of FIG. 6.

In further detail, to facilitate the parsing of an enhanced manifest, an optimized enhanced manifest can eliminate XML tags for a plurality of separate segment durations and aggregate the segment durations within a single string under an element name such as <EncodedSegDurations>. To ensure that segment durations can be parsed and associated with the corresponding fragment, segment durations can be represented with text elements having the same fixed length and can be delimited by a character such as a semicolon, as follows:
<EncodedSegDurations>0000BBB0;0000BBB0; . . . 0000BBB0</EncodedSegDurations>

Similarly, an optimized enhanced manifest can eliminate XML tags for a plurality of separate segment byte ranges and aggregate the segment byte ranges within a single string under an element name such as <EncodedSegList>. To ensure that byte ranges can be parsed and associated with the corresponding fragment, segment byte-ranges can be represented with text elements having the same fixed length and can be delimited by a character such as a semicolon, as follows:
<EncodedSegList>000000000-000006999; . . . 000006999-00000E677</EncodedSegList>

An enhanced manifest can be generated such that per-fragment metadata is provided according to one or more of the implementations depicted in FIGS. 5-7. For example, per-fragment metadata may be provided separately for each segment within segment list 514 of representation 506 as depicted in FIG. 5, may be provided within an element that is within representation 506 but external to segment list 514 of representation 506 as depicted in FIG. 6, and/or may be provided within an element of each adaptation set 504 as depicted in FIG. 7. Moreover, the implementations depicted in FIGS. 5-7 are merely illustrative, and other formats for generating enhanced manifests are possible. Furthermore, the examples of the types of metadata that may be provided in an enhanced manifest described above are merely illustrative, and other types of metadata may also be included in an enhanced manifest.

A specific implementation will now be described with reference to FIG. 2, the computing environment of FIG. 3 the manifest formats of FIGS. 5-7, and the flow diagrams of FIGS. 8, 9, and 10.

Figure 8:
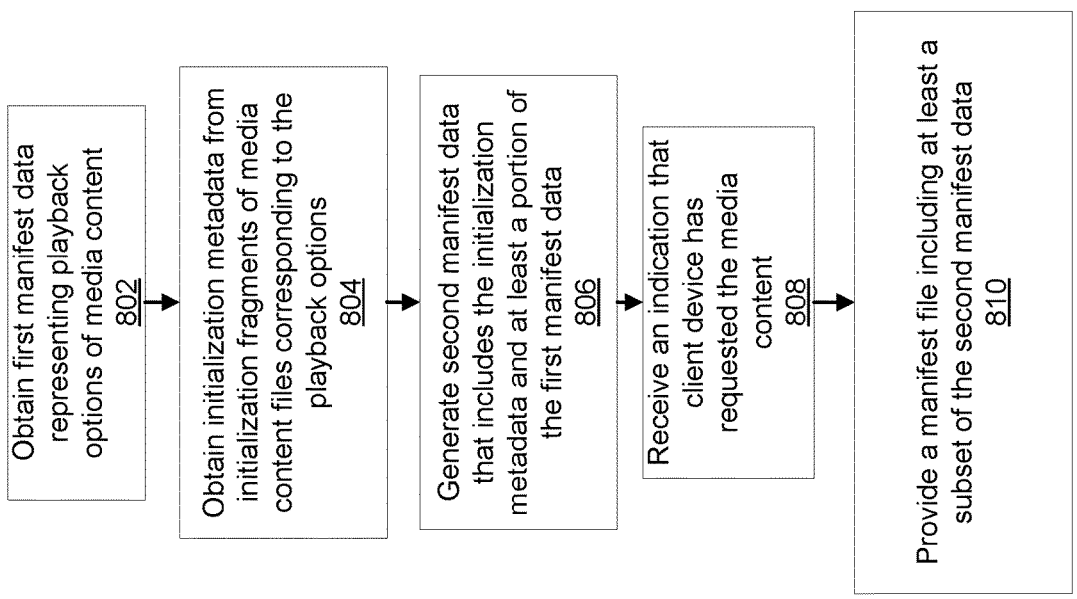
FIG. 8 is a flowchart illustrating a method of providing enhanced manifests for media content playback.
Figure 9:
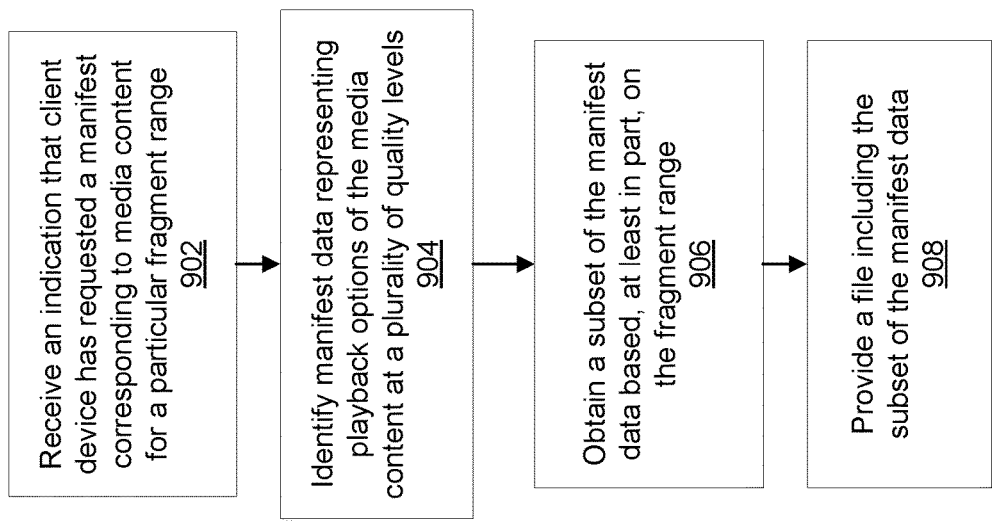
FIG. 9 is a flowchart illustrating a method of performing manifest segmentation for media content playback.

FIG. 8 is a flowchart illustrating a method of providing enhanced manifests for media content playback. First manifest data 110 representing playback options of media content at a plurality of quality levels is obtained at 802, where each of the playback options is associated with a corresponding plurality of media fragments. The first manifest data 110 can indicate locations at which the media fragments associated with each of the playback options can be accessed. In addition, the first manifest data 110 can indicate locations of initialization fragments of media content files corresponding to the playback options. For example, first manifest data 110 can include URLs and/or byte ranges corresponding to media fragments for each of the playback options. In one implementation, first manifest data 110 can include per-fragment quality values that each indicates a visual quality of the corresponding media fragment.

Initialization metadata is obtained from the initialization fragments of media content files corresponding to the playback options at 804. More particularly, for at least one of the playback options, a location of an initialization fragment of a corresponding media content file is ascertained. The initialization fragment is retrieved and parsed to obtain initialization metadata from the initialization fragment of the corresponding media content file. For example, the initialization metadata can include codec private data for at least one of the playback options. The initialization metadata can also include per-fragment metadata such as per-fragment durations and/or quality values for at least one of the playback options.

Second manifest data 220 is generated at 806 based, at least in part, on the first manifest data 110 and the initialization metadata. The second manifest data 220 can include the initialization metadata and at least a portion of the first manifest data 110. The second manifest data 220 need not include the locations of initialization fragments that are contained within the first manifest data 110. Second manifest data 220 can be generated statically or dynamically (e.g., in response to a client request for the media content).

An indication that a client device has requested the media content is received at 808. For example, the client device may request the media content by submitting a request with a parameter indicating that the client device is requesting an enhanced manifest (rather than a conventional manifest). The request may also include an additional parameter that indicates a particular fragment range.

In the implementation depicted in FIG. 8, the client device supports enhanced manifests. The client device may have specifically requested an enhanced manifest for the media content or may have previously opted-in to receive enhanced manifests. Alternatively, a device profile (e.g., device characteristics) may indicate that the client device supports enhanced manifests.

A manifest file including at least a subset of the second manifest data 220 is provided at 810. The manifest file can be generated dynamically (e.g., in response to receiving the indication that the client device has requested the media content). Alternatively, a previously generated manifest file can be retrieved and provided. Since initialization metadata obtained from the initialization fragments of the media content files has been included in the manifest file, the manifest file need not indicate the locations (e.g., URLs) of the initialization fragments of the media content files.

In one implementation, the manifest file can include, for each of the playback options (e.g., representations), codec private data and per-fragment metadata for each of the fragments corresponding to the playback option. The per-fragment metadata can include a duration for the fragment and/or an indication of a quality value for the fragment. In one implementation, the manifest file conforms to an optimized format. More particularly, the manifest file can include, for each adaptation set, a string of text elements having the same fixed length, where each of the text elements represents a duration for a corresponding one of the segments of playback time represented within the adaptation set. In addition, the manifest file can include, for each of the playback options, a string of text elements having the same fixed length, where each of the text elements represents a byte range for a corresponding one of the fragments corresponding to the playback option.

Where the client device has requested media content for a particular fragment range, the manifest file can include only a portion of the second manifest data. The portion of the second manifest data can correspond directly to the fragment range or, alternatively, can correspond to a range of which the fragment range is a subset. An example method of segmenting manifest data will be described in further detail below with reference to FIG. 9.

A conventional manifest file or an enhanced manifest file can be segmented to generate one or more smaller manifest file(s). FIG. 9 is a flowchart illustrating performing manifest segmentation for media content playback. Manifest segmentation can be performed by one or more servers such as edge server 225 and/or manifest server 230. Segmentation of a manifest can be performed prior to receiving a request for media content such that subsets of the manifest are stored for servicing media content requests at a later time. Alternatively, segmentation of a manifest can be performed dynamically in response to a request for media content.

An indication that a client has requested a manifest corresponding to media content for a particular fragment range is received at 902. For example, the indication can be received by edge server 225 as a parameter of the client's request for a manifest corresponding to the media content. As another example, the indication can be received by manifest server 230 from edge server 225. The fragment range can be indicated by a start time and duration or, alternatively, can be identified via indices of a fragment index.

In other embodiments, the client indicates a request for a fragment range (e.g., only a portion of the manifest data for the media content) without indicating a particular fragment range. In other words, the particular fragment range (e.g., temporal range or range of fragment indices) may be implicit rather than explicit. In these instances, edge server 225 assumes that the request is for an initial portion of the manifest data or, alternatively, a subsequent portion of the manifest data (e.g., corresponding to subsequent media fragments) where the client has previously requested a portion of the manifest data for the same media content. Therefore, edge server 225 may ascertain a particular fragment range (e.g., a fixed size temporal range or fixed size range of fragment indices) based, at least in part, upon prior manifest requests for the same media content.

Manifest data representing playback options of the media content at a plurality of quality levels is identified at 904, where each of the playback options is associated with a corresponding plurality of fragments. In one implementation, the manifest data indicates, for each of the playback options, durations and byte ranges for the corresponding fragments. For example, the manifest data may be an optimized enhanced manifest, as described above with reference to FIG. 6 and FIG. 7.

A subset of the manifest data is obtained at 906 based, at least in part, on the particular fragment range and a manifest file including the subset of the manifest data is provided at 908. For example, the subset of the manifest data may correspond directly to the particular fragment range requested by the client device, as described above with reference to manifest 222 of FIG. 2. The subset of the manifest data may be obtained from a conventional manifest or an enhanced manifest, which may be in an optimized format. In one implementation, the subset of the manifest data is enhanced and/or optimized prior to providing the manifest at 908. In this manner, the client device can receive a smaller manifest that will consume less memory and CPU resources.

Segmentation of a manifest can be performed dynamically such that a manifest file including the subset of the manifest data that has been requested is generated in response to the indication of the client request. Thus, the manifest file can include only the subset of the manifest data that pertains to the requested fragment range. In other words, the manifest file can exclude the remainder of the manifest data of the enhanced manifest other than the subset of the manifest data pertaining to the requested fragment range.

Alternatively, the manifest can be segmented according to fixed same size temporal ranges or fixed same size byte ranges. For example, the manifest data within the manifest can be segmented along one hour boundaries. Thus, each of a plurality of subsets of the manifest data can be stored in a different one of a plurality of files. Where segmentation is performed prior to receipt of a request from the client, the manifest file provided to the client may not correspond directly to the requested fragment range. In this example, the client device may have indicated that they are interested in a particular half-hour segment of the media content, and the client device may be provided a manifest file that corresponds to an hour temporal range that includes the half-hour segment.

Segmentation can include partitioning code within the manifest data. For example, segmentation can be performed between or within adaptation sets, representations, and/or segment lists. In addition, codec private data associated with the playback options may be segmented. For example, the codec private data associated with only a subset of the playback options may be provided within a manifest file. Where the manifest is an optimized enhanced manifest such as that described above with reference to FIG. 6 and FIG. 7, segmentation can include partitioning strings representing durations and/or byte ranges corresponding to a pertinent fragment range. For example, where a string represents byte ranges for a particular playback option of the media content, the string can be partitioned to obtain only a portion of the text elements in the string. As another example, where a string represents durations for a particular adaptation set, the string can be partitioned to obtain only a portion of the text elements in the string.

In one implementation, the client device may be configured to request initial or subsequent portions of the manifest data for the media content. Where the client has previously requested a portion of the manifest data for the media content from edge server 125 and the client is requesting another portion of the manifest data for the media content, edge server may not provide codec private data in the manifest. Where the client device has requested a portion of the manifest data for the media content rather than a complete manifest, the client device may maintain copies of content of previously received manifests for the media content and/or an indication of those portions of the manifest data that it has received.

As described above, the client device can be configured to opt in to receive enhanced manifest data or request an enhanced manifest for media content. After the client device receives a manifest including enhanced manifest data such as manifest 220 or 222, the client device can use a portion of the manifest data to initiate playback of the media content.

Figure 10:
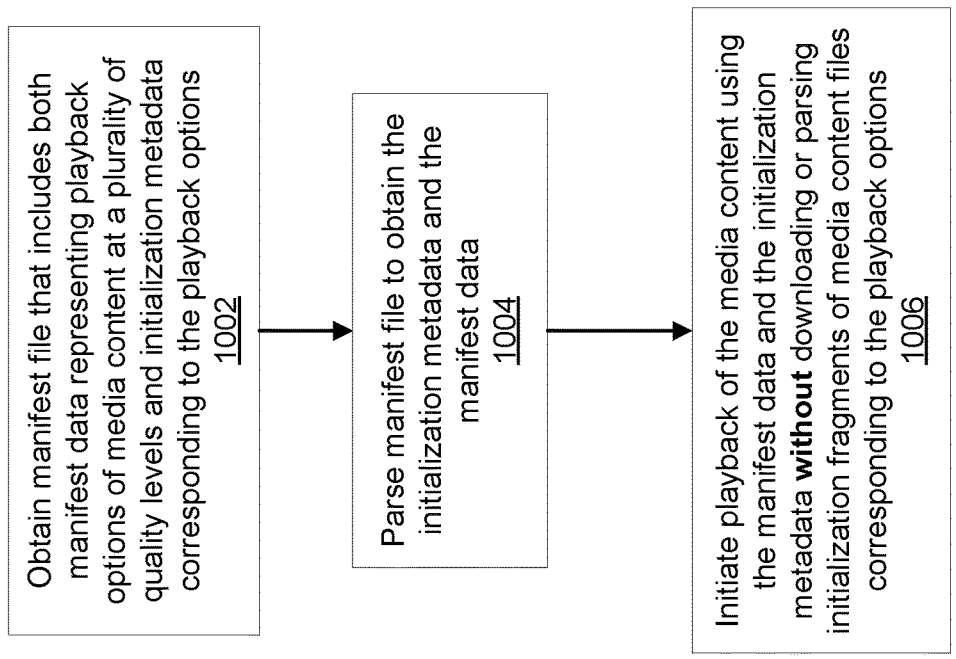
FIG. 10 is a flowchart illustrating a method of processing an enhanced manifest for media content playback.

FIG. 10 is a flowchart illustrating a method of processing an enhanced manifest for media content playback. A client device obtains a manifest file including manifest data representing playback options of media content at a plurality of quality levels at 1002 and initialization metadata corresponding to the playback options, where each of the playback options is associated with a corresponding plurality of fragments. The initialization metadata can include, for at least one of the playback options: codec private data and per-fragment metadata for each of the fragments for the playback option. For example, the per-fragment metadata can include an indication of a duration for the fragment and/or an indication of a quality value for the fragment. In one implementation, the manifest file does not indicate locations of the initialization fragments of the media content files corresponding to the playback options.

Where the manifest file is an optimized enhanced manifest, the manifest file can include strings that each consolidates information for multiple fragments or segments. In one implementation, the manifest file can include for at least one adaptation set, a string including text elements having the same fixed length, where each text element represents a duration for a corresponding one of a plurality of segments of playback time that is represented within the adaptation set, where each of the segments corresponds to a fragment for each of the playback options represented by the adaptation set. In addition, the manifest file can include for at least one of the playback options, a string including text elements having the same fixed length, where each text element represents a byte range for a corresponding one of the fragments for the playback option.

The client device parses the manifest file to obtain the initialization metadata and the manifest data at 1004. As described above, the initialization metadata can include codec private data and per-fragment metadata such as durations and/or quality values. Where the manifest file is an optimized enhanced manifest, the client device may, prior to initiating playback of the media content, obtain a string representing either durations or byte ranges from the manifest and store the string (e.g., without parsing the string). For example, prior to initiating playback of the media content, the client device may obtain a string representing byte ranges for one of the playback options from the manifest file and store the string without parsing the string to ascertain each of the byte ranges.

Next, the client device initiates playback of the media content at 1006 using the initialization metadata and the manifest data without downloading or parsing initialization fragments of media content files corresponding to any of the playback options, as will be described in further detail below. During playback, the client device may perform additional parsing of a portion of the initialization metadata such as a string representing byte ranges or fragment durations.

The client device may select a media fragment corresponding to one of the playback options. Typically, the decision to switch bitrates during adaptive bitrate streaming is based upon current bandwidth and the assumption that a fragment that consumes more bits will look better. As a result, where there is available bandwidth, the client device will typically request the larger fragment. In one implementation, the client device selects the media fragment based, at least in part, on a current bandwidth and media fragment quality values. To illustrate this selection process, an example of a portion of an enhanced manifest is set forth below:

<Rep 5000k>
  <SegmentURL        mediaDuration="90000-100000" Q="10">
  <SegmentURL        mediaDuration="100000-110000" Q="2">
</Rep 5000k>
</Rep 10000k>
  <SegmentURL        mediaDuration="200000-220000" Q="10">

```
    <SegmentURL    mediaDuration="220000-240000"
Q="6">
</Rep 10000k>
```

In this example, the first segment of the media content corresponds to a black screen, while the second segment of the media content corresponds to an explosion. The 10000k representation is typically assumed to be of a higher quality since it includes twice as many bits as the 5000k representation. However, rather than assuming that the fragment that includes a greater number of bits will provide a better viewing experience for the user, in one implementation, the client device compares the quality values of the fragments for the corresponding segment to ascertain an objective measure of the visual quality of the corresponding fragments. The client device ascertains that, for the first segment of the media content, the quality value for the first fragment for the 5000k representation is the same as the quality value for the first fragment of the 10000k representation. As a result, the client device selects the first fragment of the 5000k representation since it can be displayed with fewer bits than the first fragment of the 10000k representation while providing the same visual quality as the first fragment of the 10000k representation. This additional bandwidth can be used for another fragment for which the additional bits will provide a better viewing experience. Upon ascertaining that the second fragment of the 10000k representation has a quality value of 6 and the second fragment of the 5000k representation has a quality value of 2 (assuming a higher quality value indicates a higher visual quality), the client device selects the second fragment of the 10000k representation since there is a significant visual upgrade.

The client device can initialize its video decoder using the codec private data corresponding to the selected playback option (e.g., bit rate). In addition, where the initialization metadata is in an optimized format, the media player of the client device can retrieve a string representing byte ranges and/or a string representing durations for use during playback.

In one implementation, the client device can retrieve a string representing byte ranges for one of the playback options. To retrieve a particular fragment, the client device can ascertain an offset that corresponds to the fragment based, at least in part, on the length of an individual text element within the string. For example, where each text element is 10 characters in length and the client device is interested in the 7$^{th}$ segment (or fragment), the offset may be 70 characters. Where a single text character such as a semicolon separates the text elements from one another, the offset is 77 characters. In this example, the desired text element representing the desired byte range may be located at 78-87 characters within the string.

During playback of the media content, the text element at the offset can be obtained from the string and parsed to ascertain the byte range for the desired fragment. The fragment corresponding to the byte range can be downloaded, and playback of the fragment can then be initiated. By delaying the parsing of the strings of an optimized enhanced manifest to runtime, the time to first frame can be significantly reduced. Furthermore, by limiting parsing efforts to only the text element that corresponds to the fragment that the client device is interested in accessing next, the amount of parsing performed by the client device during runtime is minimal.

Similar benefits can be obtained during seek time. For example, where a user attempts to seek to a particular time within the media content in relation to the start of the media content playback, the media player can use the fragment durations for the playback option to accurately identify the desired fragment. In one implementation, the media player of the client device can retrieve the string that contains the durations for the playback option. The string can be parsed prior to playback or during playback, as set forth above. To ascertain the duration for a particular fragment, an offset within the string that corresponds to the fragment can be ascertained based, at least in part, upon the length of the text elements within the string.

Additional implementations of streaming systems that provide a reduced time to first frame will now be described with reference to FIGS. 11-14, the computing environment of FIG. 3, the manifest formats of FIGS. 5-7, and the flow diagram of FIG. 15.

Figure 11:
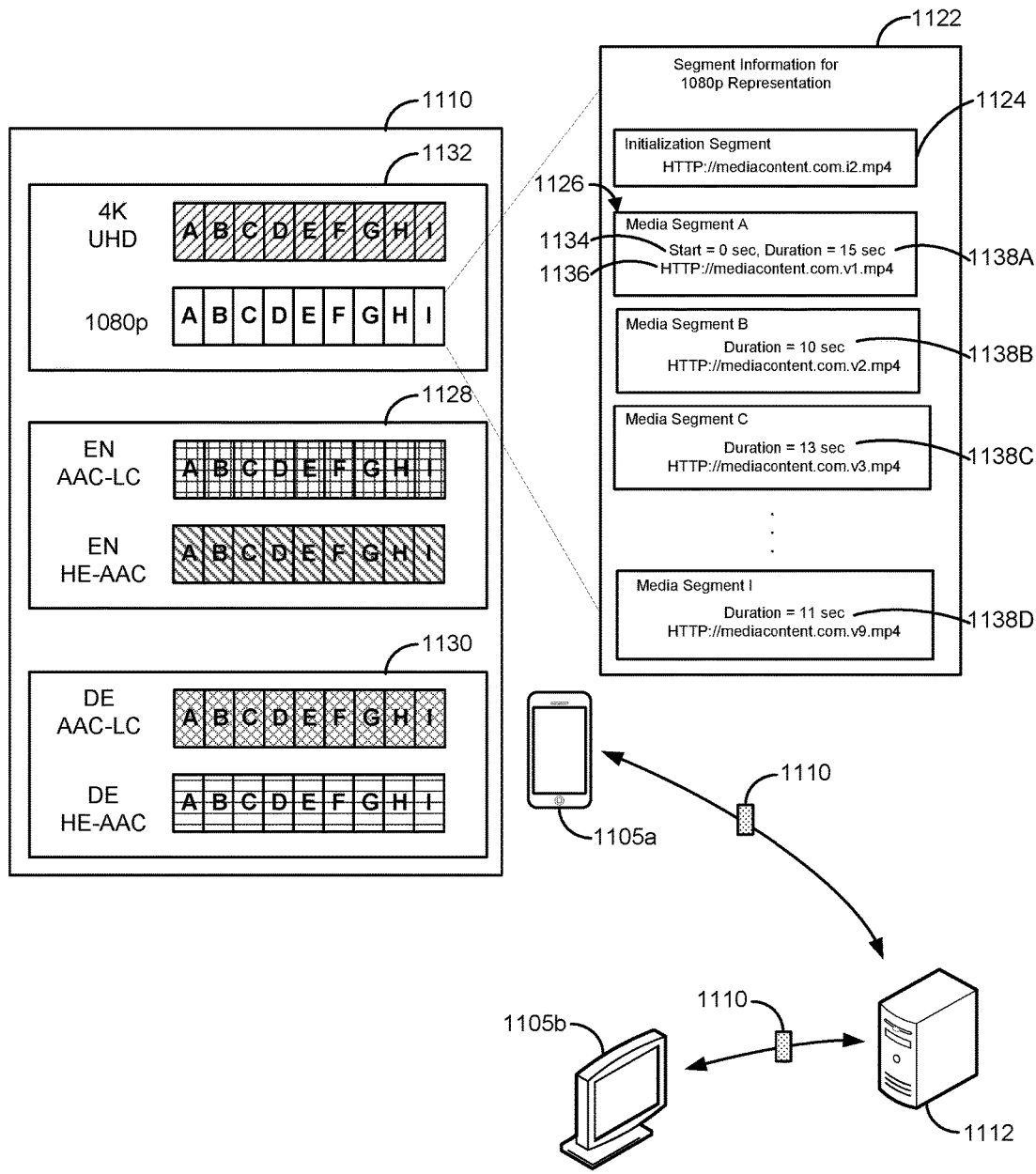
FIG. 11 illustrates a second example of a DASH manifest provided for media content playback.

FIG. 11 illustrates an example of a manifest 1110 provided for media content playback. Viewer devices 1105a and 1105b receive manifest data such as manifest 1110 from server 1112. Manifest 1110 provides different playback options for media content. Manifest 1110 indicates segments A-I for playback options of the media content corresponding to 4K UHD, 1080p, Low Complexity AAC (AAC-LC), High-Efficiency Advanced Audio Coding (HE-AAC, such as the v1 and v2 profiles) in the English language, and AAC-LC and HE-AAC for the German language. The 4K UHD and 1080p playback options represent different video quality levels for the media content, and form adaptation set 1132. The AAC-LC and HE-AAC English playback options represent different audio quality levels for a first language for the media content, and form adaptation set 1128. The AAC-LC and HE-AAC German playback options represent different audio quality levels for a second language for the media content, and form adaptation set 1130.

Manifest 1110 includes segment information 1222 for each of the different playback options. Segment information 1222 includes media segment information 1226 for each of the segments associated with the corresponding playback option of the media content. In certain implementations, segment information 1222 includes information on initialization segment 1224. In various implementations, initialization segment 1224 is not present, as media segments for a particular playback option are self-initializing.

The media segment information 1226 for each segment identifies a location 1136 of the corresponding media segment (e.g., a URL, which may include a temporal or byte range), indicates a start time 1134 of the segment relative to an initial start time or timeline of the period of playback of the media content, and also indicates a segment duration 1138 corresponding to a playback interval for that segment. As shown in FIG. 11, the durations for each segment duration 1138A-D are different values.

DASH manifests are larger than Microsoft Smooth Streaming manifests because there is a need to store per-quality level byte range information for each segment. When this difference in information storage is applied to each of the multiple components in a manifest (e.g., multiple audio streams and quality levels), the overall amount of data in the DASH manifest becomes approximately 12-15 times the size of the corresponding Microsoft Smooth Streaming manifest. The large size of a DASH manifest impacts performance, especially for low cost and memory constrained devices. As one example, a video streaming service has a media content catalog with multiple titles that are over 6 hours long, and such titles corresponds to manifest file sizes of several megabytes.

As the size of manifest 1110 increases, the network transmission time for manifest 1110 increases. Furthermore, unlike segments that have already been played back and are removed from memory, manifest 1110 is typically preserved in memory during playback of the requested interval of media content, thereby increasing memory requirements at viewer devices 1105*a-b*. Moreover, a large manifest increases the computing demands associated with parsing the manifest file. Thus, time to download, memory allocation for storage, and processing time for parsing are separate system performance concerns that are impacted by manifest file size.

Figure 12:
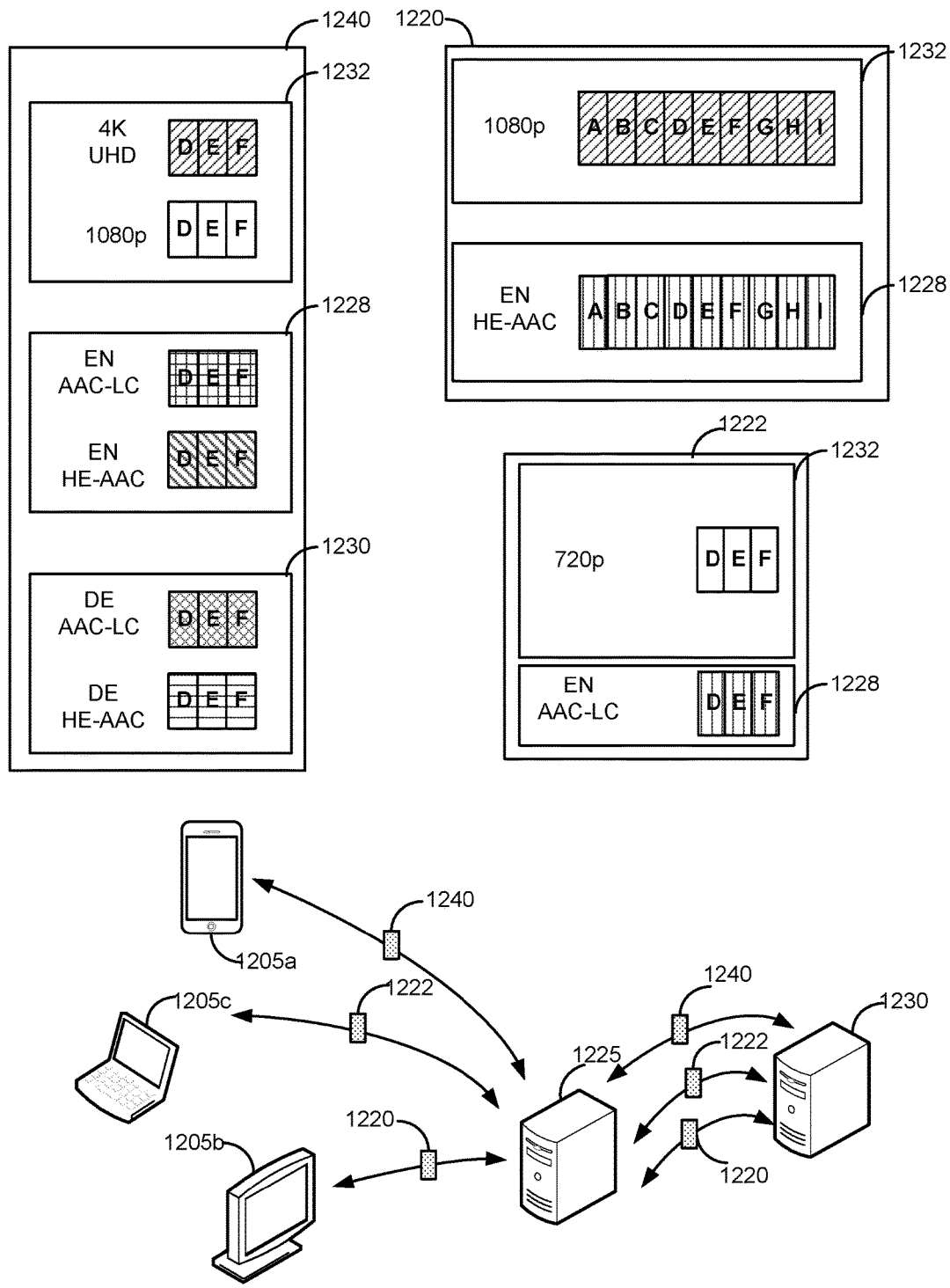
FIG. 12 illustrates an example of a computing environment in which partitioned manifests can be provided for media content playback.

In accordance with various implementations, the size and complexity of a manifest is reduced by using manifest partitioning. As shown in FIG. 12, viewer devices 1205*a-c* receives partitioned manifest data, such as manifest 1240, manifest 1220, and manifest 1222, respectively, providing playback options for the same media content (e.g., episode #1 of the television show Super Train). As illustrated in FIG. 12, the contents of manifest 1240, manifest 1220, and manifest 1222, are reduced relative to manifest 1110 of FIG. 11.

Examples of two independent techniques for reducing the size of manifest 1110 include temporal partitioning and playback option partitioning. Temporal partitioning is illustrated by manifest 1240, which includes all playback options in manifest 1110, but only includes segment D-F. Playback option partitioning is illustrated by manifest 1220, which includes all segments A-I in manifest 1110, but only includes two playback options. It should be appreciated that the two techniques can be used in a hybrid implementation, as illustrated by manifest 1222, which includes only segments D-F and two playback options. It should further be appreciated that temporal partitioning, playback option partitioning, and hybrid temporal-playback option partitioning can each be combined with the techniques for enhancing manifests as described earlier, such as, for example, integration of initialization information, optimization of markup in the manifest to simplify parsing, and flexibility in locating per-segment metadata within the manifest.

Temporal partitioning corresponds to providing manifest data for only part of the overall temporal range of the media content. In certain implementations, the part of the overall temporal range is a time range (or approximate time range) that corresponds to a time range requested by the viewer device. In other implementations, the part of the overall temporal range is set by a media server or a manifest server (e.g., 1225 or 1230) using, for example, a default time interval, or the elapsed time range associated with a prior manifest request. It should be appreciated that during streaming of the media content to the viewer device, certain partitioned manifests may be based on time ranges specified by the viewer device, and other partitioned manifests may be based on time ranges determined by a media or manifest server.

In the depicted implementation, manifest 1220 corresponds to the entire temporal range of segments of the media content, while manifest 1222 and manifest 1240 correspond to a particular temporal subset. For example, manifest 1222 and manifest 1240 correspond to a particular temporal or byte range requested by viewer device 1205*c* and viewer device 1205*a*, respectively.

In this example, each of viewer devices 1205*a-c* request a partitioned manifest or opt-in to receive partitioned manifests. Media server 1225 contacts manifest server 1230 regarding the requests, and manifest files 1240, 1220, and 1222 are provided by manifest server 1230 in communication with media server 1225. Alternatively, any of manifest files 1240, 1220, 1222 are provided independently by media server 1225.

A partitioned manifest such as manifest 1240, 1220 or 1222 is generated statically or dynamically (e.g., in response to a request from a viewer device), and is generated by a server such as manifest server 1230 or media server 1225. In the depicted implementation, manifest files 1240, 1220 and 1222 are generated by manifest server 1230.

In FIG. 12, viewer device 1205*a* and 1205*c* provide at least a first parameter, where the first parameter is associated with a temporal range corresponding to a subset of a temporal range for the media content. For example, the temporal range for the subset is requested in the form of a start time and time duration.

As an example, for media content with a two hour duration, a viewer device requests a manifest file corresponding to a 30 minute duration, and requests subsequent 30 minute intervals as playback of the media content progresses. Media server 1225 assigns the manifest file with a 45 minute lifespan to force a viewer device to retrieve a new manifest file after the expiration time. Viewer device 1205*a* and viewer device 1205*c* provide to media server 1225 parameters such as "startTime," which corresponds to a starting position in milliseconds or other time unit, and a parameter such as "lenTime," which corresponds to a temporal range. In some implementations, a viewer device specifies an "endTime" corresponding to a manifest stop time in milliseconds or other time unit.

An example of a manifest request to a server with a base URL of "http://s3.ll.dash.us.aivcdn.net/" for a representation corresponding to 1080p using "videoquality$1080p" and for a temporal range using "startTime=4000" and "endTime=5000000" is as follows: http://s3.ll.dash.us.aivcdn.net/d/1$ADVBD696BHNV5, 1871E004/videoquality$1080p/cfb7/6a18/1d37/4222-80f4-006b1a408e92/7d42a9c4-ccae-416d-9749-1f3475a534a0_corrected.mpd?startTime=4000&endTime=5000000

In certain implementations, if no start time is provided, the beginning of the title is used as the default by media server 1225, and if no length is provided, the remaining length of the manifest (i.e., manifest length—start time) is used as the default by media server 1225.

Media server 1225 responds to the viewer device's request for the specified start time and duration by packaging a portion of the manifest that includes the temporal range as requested, taking into account any boundary and temporal alignment restrictions. For example, the requested start time is rounded down to the nearest segment or period boundary, and the duration is rounded up such that the end time of the manifest file corresponds to a nearest segment or period boundary. As another example, the requested start time is rounded down to the earliest ad period boundary when an associated ad is not skippable, or is rounded to the nearest media content period or segment boundary if an associated ad is skippable.

In some implementations, the time range in the manifest provided in response to a request for a partitioned manifest is of high granularity. For example, the provided manifest matches the temporal range that is requested. In other implementations, such as, for example, where cache efficiency concerns are a limitation, the granularity of the temporal range for providing manifest 1210 to a viewer device is coarser, such as by being limited to certain predefined boundaries. For example, the start time for a manifest file is restricted to intervals of 100 seconds, and/or the duration is restricted to intervals of 50 seconds. It should be appreciated that both high granularity and coarse granularity can be supported in the same system. For example, for a video streaming service, subscribers with one type of subscription plan are limited to the coarse granularity, while subscribers with another type of subscription plan are provided with a high granularity manifest.

In specific implementations, manifest 1220, 1222, and 1240 are generated by concurrent use of the segment list syntax and segment timeline syntax of MPEG-DASH. The segment timeline syntax supports a number of features such as the specification of segment-specific durations, the ability to signal discontinuities in a media content stream, and accurate timing information to support insertion of supplemental content, such as advertisements, into one or more periods of media content.

With reference to FIG. 11, the segment timeline is used to signal to viewer devices the timing characteristics of segments at specified HTTP-URLs, such as location 1136. For example, such timing information, which includes start time 1134 and duration 1138, is used to indicate the availability of segments 1126 for live scenarios. However, it should be appreciated that generating manifests that use both the segment list and segment timeline formats of MPEG-DASH applies to both video-on-demand and live scenarios.

An example of the segment timeline markup tag syntax is shown below. The segment timeline syntax presents a list of elements, and each element contains information such as "t," "d," and/or "r" values associated with a segment. The "t"-value corresponds to start time 1134 of FIG. 11, which represents a timestamp of a first segment indicated in manifest 1110, corresponding to the segment labeled "Media Segment A" in FIG. 11. Furthermore, the segment labeled "Media Segment A" in FIG. 11 has an exact duration specified by the first "d"-value, which is set to a value of 50 as shown in the example markup below. The time in milliseconds or other units of time corresponding to the duration value of 50 is derived based on the "timescale" parameter that is defined separately in the manifest ("25" in the example syntax shown). The "r"-value signals to a viewer device how many consecutive segments with the same duration are available. The below example syntax shows that there are 4 consecutive segments with the same duration value of 50, followed by one segment with duration 51, followed by 3 segments with duration 50, followed by one segment with duration 49.

. . .
timescale="25"
. . .
<SegmentTimeline>
<S t="0" d="50" r="3"/>
<S d="51"/>
<S d="50" r="2"/>
<S d="49"/>
</SegmentTimeline>
. . .

It should be appreciated that in certain implementations, no segment has the same duration as a preceding segment. The following example syntax represents nine segments, each with a different duration than a preceding segment, and therefore no "r" values are specified. It should further be appreciated that in various implementations, every segment has a different duration.
<SegmentTimeline>
<S t="0" d="50"/>
<S d="51"/>
<S d="50"/>
<S d="49"/>
<S d="48"/>
<S d="49"/>
<S d="54"/>
<S d="49"/>
<S d="25"/>
</SegmentTimeline>

In some implementations, all segments may have the same duration. The following example syntax represents nine segments having the same duration, and therefore the "r" value is specified.
<SegmentTimeline>
<S t="0" d="50" r="8"/>
</SegmentTimeline>

A timestamp of each segment in segment information 1122 is determined by taking the most recent instance that the "t"-value was specified (e.g., for "Media Segment A" in FIG. 11), and adding the total duration of all of the intervening segments to the specified "t" value. By using the segment timeline syntax, the timestamp of each segment indicated in manifest 1110 is derived without referencing a wall clock time, such as, for example, a Coordinated Universal Time (UTC) reference clock. In implementations where the media content corresponds to a live stream, the accurate signaling of time stamps for each segment simplifies the determination of the live edge, and reduces the possibility of HTTP 404 "Not Found" errors that correspond to requests for a segment that is not yet available.

Location 1134 for "Media Segment A," along with the locations for each of the other segments indicated in segment information 1122, are indicated using the segment list markup tag syntax. The example segment syntax shown below includes a first element <SegmentURL media="HTTP://mediacontent.com.v1.mp1"/>, which includes an HTTP URL indicating the location for "Media Segment A." Continuing the example, the last element <SegmentURL media="HTTP://mediacontent.com.v9.mp1"/> provides the HTTP URL for "Media Segment I" as shown in FIG. 11.
<SegmentList timescale="25">
<RepresentationIndex sourceURL="representation-index.sidx"/>
<SegmentURL media="HTTP://mediacontent.com.v1.mp1"/>
<SegmentURL media="HTTP://mediacontent.com.v1.mp2"/>
<SegmentURL media="HTTP://mediacontent.com.v1.mp3"/>
. . .
<SegmentURL media="HTTP://mediacontent.com.v1.mp9"/>
</SegmentList>

The segment list information and segment timeline information together provides the viewer devices 1105a-c information on the timing characteristics and location of each of the segments A-I that can be requested. The information reduces a time to first frame, such as, for example, when viewer devices 1105a-c are performing a seek operation for a specific scene of the media content. Moreover, certain implementations using the segment timeline and segment list syntax as described allows provisioning of a video service as a platform for third-party developers, such as, for example, by providing an MPEG DASH standards compliant software development kit (SDK).

Returning to FIG. 12, manifest 1222 and manifest 1240 are illustrated to provide information only for segments D-F. As an example, such information is formatted using the segment timeline and segment list syntax as shown below. The "t"-value with a value of "150" corresponds to a start time for segment D in FIG. 12. For example, media server 1225 calculates based on manifest 1110 that segment D has a start time value of "150" based on the three preceding segments in the period having a duration value of "50," and the "t" value for the first segment period being "0".

The below example syntax shows that there are 2 consecutive segments with the same duration value of 50 (corresponding to segments D and E), followed by one segment with duration 51 (corresponding to segment F). Segment specific information pertaining to segments A-C, G-I are not included.

. . .
timescale="25"
. . .
<SegmentTimeline>
<S t="160" d="50" r="2"/>
<S d="51"/>
</SegmentTimeline>

Continuing the example, the locations for each of the segments D-F are indicated using the segment list syntax shown below.

<SegmentList timescale="25">
<RepresentationIndex sourceURL="representation-index.sidx"/>
<SegmentURL media="HTTP://mediacontent.com.v1.mp4"/>
<SegmentURL media="HTTP://mediacontent.com.v1.mp5"/>
<SegmentURL media="HTTP://mediacontent.com.v1.mp6"/>
</SegmentList>

The example segment syntax shown includes a first element <SegmentURL media="HTTP://mediacontent.com.v1.mp4"/>, which includes an HTTP URL indicating the location for segment D, and similarly for segments E-F. Segment specific information pertaining to segments A-C, G-I are not included, thus the size of manifest 1222 and manifest 1240 are reduced.

In certain implementations, the syntax for representing a manifest that is temporally partitioned uses the @xlink element in the AdaptationSet tag as defined in Table 5 of the MPEG DASH standard, or the @xlink element in the SegmentList tag defined in Table 14 of the MPEG DASH standard. However, the @xlink element is not available in certain implementations, such as for implementations using the profile of "urn:mpeg:dash:profile:isoff-ondemand: 2011" and "urn:mpeg:dash:profile:isoff-main:2011". In some implementations using the @xlink element, a "t" value is necessary to indicate discontinuities in a timeline.

In various implementations, the syntax for representing a manifest that is temporally partitioned uses the hierarchical "sidx" boxes in segment data, and the @indexRange element. For example, each of the segments D-F includes data that conforms to the ISO base media file format which stores data in a series of objects, referred to as "boxes." As an example, segment D includes a file type (FTYP) box, a movie (MOOV) box, movie fragments (also referred to as movie fragment boxes (MOOF)), and a movie fragment random access (MFRA) box. Furthermore, segment D includes one segment index ("sidx") box, and in some implementations, additional "sidx" boxes between movie fragments. A "sidx" box includes information that describes byte ranges for one or more of the movie fragments in segment D. In various implementations, the "sidx" box(es) may be provided in the MOOV box, following the MOOV box, before or after the MFRA box, or elsewhere within segment D. In implementations using "sidx" for manifest temporal partitioning, for seeks to arbitrary time positions, a viewer device may need to download two partitions in a short time interval. This requirement may impact performance and increase complexity for maintaining a constant-size sliding window for time and byte range indexing. Moreover, similar to the @xlink element, each representation requires a separate HTTP Get operation to retrieve the "sidx" box corresponding to the respective representation.

Manifest server 1230 partitions manifest 1240 either prior to receiving a request from media server 1225 or dynamically in response to receiving the request. More particularly, manifest server 1230 partitions manifest 1240 along half hour or hour boundaries, and saves the portions of manifest 1240 as separate manifests. Alternatively, manifest server 1230 dynamically generates manifest 1222 by obtaining a portion of manifest 1240 pertaining to playback of the requested temporal range, such as a half hour, of media content, which in FIG. 12 corresponds to segments D-F of the media content associated with different playback options. For example, each segment corresponds to 10 minutes of playback time. In the implementation depicted in FIG. 12, missing segments A-C and G-I cannot be requested by viewer device 1205a using manifest 1240 because the requests for them cannot be properly made due to them not being included in manifest 1240. In other implementations, manifest server 1230 retrieves a manifest file that corresponds to a greater period of time (e.g., an hour) than that requested (e.g., a half hour), but is still a smaller file than manifest 1110.

FIG. 12 also illustrates the use of playback option partitioning to reduce the contents of manifest 1220 and manifest 1222, relative to manifest 1110 of FIG. 11. As an example, playback option partitioning under the DASH standard corresponds to selecting a subset from available representations and/or adaptation sets.

Referring to FIG. 11, the playback options in manifest 1110 may differ by one or more encoding parameters such as bitrate, resolution, language, codec, etc. As additional examples, subtitles in a variety of languages may form playback options, and different sound configurations such as stereo or Dolby 5.1/7.1 surround sound may correspond to different playback options. As yet further examples, playback options may be provided for each camera angle or camera perspective, or playback options may correspond to different fields of depth for three-dimensional (3D) video.

In an example implementation using the MPEG DASH standard, playback options are grouped into an adaptation set based on a common characteristic. For example, playback options corresponding to different representations of the video portion of the media content are grouped together to form a first adaptation set 1132. As another example, the English playback options for the audio portion of the media content form a separate group corresponding to second adaptation set 1128. Similarly, the German playback options for the audio portion of the media content form a group of playback options corresponding to third adaptation set 1130.

As mentioned earlier, partitioning can include partitioning code within the manifest data. For example, partitioning can be performed between or within adaptation sets, representations, and/or segment lists.

In FIG. 12, media server 1225 partitions manifest 1110 to remove playback options based on viewer device capabilities. For example, media server 1225 eliminates the quality levels with non-square pixel aspect ratios for viewer devices not capable of rendering non-square pixel aspect ratios. Similarly, media server 1225 eliminates the UHD quality level for viewer device 1205c, which in this example is capable of a maximum quality level of 1080p.

In addition to partitioning based on playback options that are not supported by the hardware characteristics of a viewer device, media server 1225 partitions manifest 1110 based on viewer device preferences.

For example, viewer device 1205c prefers just one audio encoding, the HE-AAC encoding, within the audio adaptation set 1228 corresponding to the English language. A conventional media server or manifest server provides both AAC-LC and HE-AAC encodings in the English audio adaptation set 1228. In the implementation of FIG. 12, media server 1225 eliminates the playback option of HE-AAC based on viewer device preferences, even though the hardware of the viewer device supports the playback option.

In the implementation illustrated in FIG. 12, viewer devices 1205b-c provide parameters to media server 1225 indicating capabilities or preferences relating to playback options. It should be appreciated that media server 1225 can infer capabilities or preferences of a viewer device from information sources other than the viewer device itself, such as by referring to a device capabilities database or information on past behavior for a viewer device.

For example, the viewer device provides to manifest server 1225 minVideoBitRate/minAudioBitRate parameters corresponding to minimum video or audio bit rate, and maxVideoBitRate/maxAudioBitRate parameters corresponding to maximum video or audio bit rate.

An example of a manifest request to a server with a base URL of "http://s3.ll.dash.us.aivcdn.net/" that specifies the video bitrate range constraint using "minVideoBitRate=150000&maxVideoBitRate=5000000" is as follows: http://s3.ll.dash.us.aivcdn.net/d/1$ADVBD696BHNV5,1871E004/videoquality$1080p/cfb7/6a18/1d37/4222-80f4-006b1a408e92/7d42a9c4-ccae-416d-9749-1f3475a534a0_corrected.mpd?minVideoBitRate=150000&maxVideoBitRate=5000000

In some implementations, if no minimum bit rate and maximum bit rate are provided, the manifest with all quality levels is assumed by media server 1225. In certain implementations, a validation check is performed on the minVideoBitRate/minAudioBitRate and minVideoBitRate/maxAudioBitRate, such as to ensure compliance with certain subscription limitations (e.g., restricting high-definition playback options for some streaming service subscriptions).

For example, viewer device 1205b, corresponding to a large screen device such as a 4K TV, prefers to not receive low video bit rates, and correspondingly the request for a manifest from viewer device 1205b specifies a minVideoBitRate of 150000. In response, media server 1225 provides manifest 1220 including only the UHD video playback option.

As another example, even though viewer device 1205c is capable of UHD playback, the device is aware that it is in a region with low internet bandwidth and sets maxVideoBitRate at 3000000. In response, media server 1225 provides manifest 1222 including the 1080p video playback option but not the UHD playback option.

As a further example, a viewer device sets minAudioBitRate and maxAudioBitRate to be 128000 and 128000, respectively, in order to get AAC-LC but not HE-AAC v1 and HE-AAC v2 for a particular language.

FIG. 12 illustrates that in addition to generating manifests that support partitioning playback options within a group of playback options, manifest partitioning occurs between groups of playback options (such as between adaptation sets under MPEG DASH). For example, FIG. 11 depicts media content having multiple track audio (MTA), one corresponding to English and one corresponding to German. Manifest 1240 of FIG. 12 includes the English audio adaptation set 1228 and the German audio adaptation set 1230. In contrast, manifest 1220 and manifest 1222 each include English audio adaptation 1228 and exclude the entire German audio adaptation set 1230.

It should be appreciated that manifest 1222 and 1220 can use a variety of formats and syntaxes to indicate a subset of playback options. As one example for an MPEG DASH system, the syntax for representing a manifest that is partitioned by playback options uses the @xlink element. For example, the @xlink element is used to indicate absent quality levels and adaptation sets as external references. However, the @xlink element is not available in certain implementations, such as for implementations using the profile of "urn:mpeg:dash:profile:isoff-ondemand: 2011" and "urn:mpeg:dash:profile:isoff-main:2011".

Manifest partitioning can include a combination of partitioning within a temporal range, partitioning within a group of playback options, and/or partitioning between groups of playback options.

Figure 13:
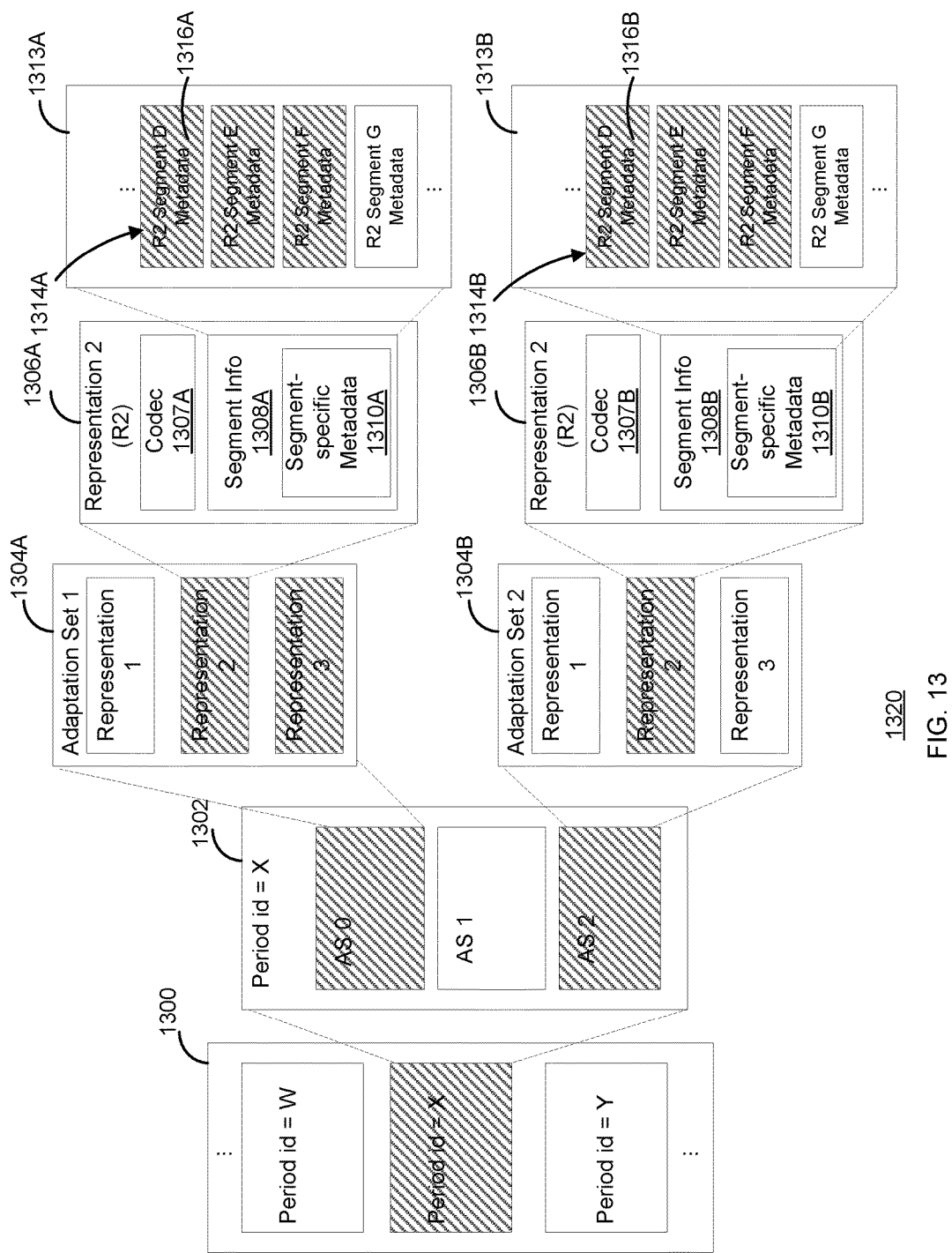
FIG. 13 illustrates an example of a format of a partitioned manifest for media content playback.

FIG. 13 illustrates an example of a partitioned manifest for media content playback. A partitioned manifest includes metadata for one or more periods 1300 of playback time of media content. In FIG. 13, partitioned manifest 1320 includes metadata for one period, as represented by the shaded box labeled "Period id=X." The periods W and Y are excluded from the partitioned manifest 1320, thereby representing temporal partitioning.

For a particular period, different playback options form groups of one or more adaptation sets. In this example, period 1302 in partitioned manifest 1320 includes two adaptation sets, with AS 0 corresponding to video, and AS 2 corresponding to English audio, as represented by the shaded boxes AS 0 and AS 2. The adaptation set corresponding to German audio, AS 1, is excluded from the partitioned manifest 1320, thereby representing partitioning between adaptation sets.

Each adaptation set 1304A-B that is included in partitioned manifest 1320 includes metadata for a plurality of representations. In this example, adaptation set 1304A includes "Representation 2" and "Representation 3," as indicated by the shaded boxes, which can correspond to UHD and 1080p. Similarly, adaptation set 1304B includes "Representation 2," as indicated by the shaded box, which can correspond to AAC-LC for the English language. The "Representation 1" under adaptation set 1304A, which can correspond to 720p, and "Representation 1" and Representation 3" under adaptation set 1304B, which can correspond to HE-AAC v1 and HE-AAC v2, are excluded. The subset of playback options within adaptation set 1304A and adaptation set 1304B each represent partitioning within a particular group of playback options, such as an adaptation set under MPEG DASH.

Each representation in the representations 1306A-B included in partitioned manifest 1320 corresponds to a different one of a plurality of playback options. More particularly, metadata associated with representation 1306A enables the media content to be played back via segments of a media file associated with the corresponding playback option, which in this example corresponds to UHD video. Similarly, metadata associated with representation 1306B enables playback of segments associated with a corresponding playback option, which in this example corresponds to AAC-LC for the English language.

In the implementation depicted in FIG. 13, partitioned manifest 1320 includes, for each representation 1306A-B, a codec private data attribute 1307A-B that includes codec private data for the respective representation. Codec private data includes parameters that are used by a client device to initialize its audio/video decoder to decode an audio/video stream for the corresponding representation.

Partitioned manifest 1320 includes, for each representation 1306A-B, segment information 1308A-B. Segment information 1308A-B includes segment list 1313A-B, which provides information to viewer devices for requesting segments of media content. Segment information 1308A-B includes metadata applicable to all segments within period 1302, and also includes metadata applicable to specific segments within period 1302, as illustrated by segment-specific metadata 1310A-B.

Segment-specific 1310A-B metadata can include, but is not limited to, segment-specific start time, segment-specific duration, segment-specific byte-range, and/or segment-specific quality value.

As shown in this example, segment-specific metadata 1310A-B is provided separately for each media segment within segment list 1313A-B. For example, segment-specific metadata 1316A, which is associated with segment 1314A, includes a start time that is provided in association with the corresponding segment. It should be appreciated that segment-specific metadata can be arranged within partitioned manifest 1320 in a variety of ways, as described in relation to FIGS. 5-7.

For each of the possible arrangements of segment-specific metadata in partitioned manifest 1320, an example syntax of segment-specific metadata 1316A for presentation of a start time of "0" and duration of "50" for segment 1313A is as follows:
<SegmentTimeline>
. . .
<S t="O" d="50"/>
. . .
</SegmentTimeline>

In FIG. 13, segment list 1313A in partitioned manifest 1320 includes segments D-F, as illustrated by the shaded boxes, which correspond to three segments of a UHD representation of the requested media content. Similarly, segment list 1313B includes segments D-F, corresponding to English audio encoded with AAC-LC. Segments D-F of segment list 1313A and segments D-F of segment list 1313B have similar segment identifiers (i.e., D-F) to convey segments associated with different playback options that are aligned in time. It should be appreciated that segments associated with different playback options may not necessarily be aligned in time.

As illustrated by the arrangement of shaded boxes in FIG. 13, partitioned manifest 1320 does not include segment G within segment list 1313A-B, thereby representing a second layer of temporal partitioning, relative to partitioning at the layer of media content periods W, X and Y. Thus, partitioned manifest 1320 includes partitioning across periods, partitioning between adaptation sets, partitioning within adaptation sets, and partitioning between segments. It should be appreciated that each of these forms of partitioning a manifest can be used with one another in any of a variety of permutations.

Figure 14:
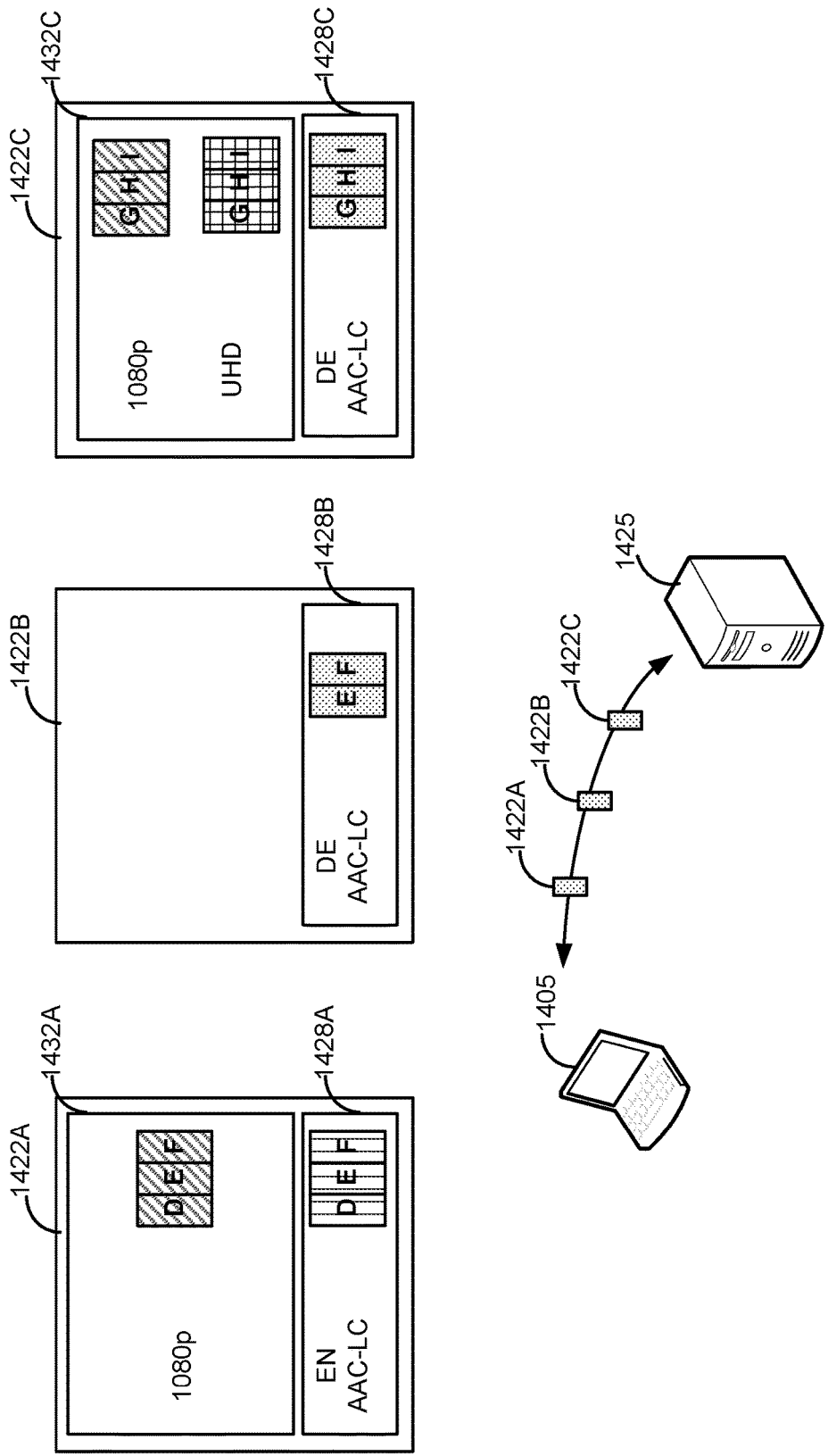
FIG. 14 illustrates an example of dynamically selecting playback options for a partitioned manifest for media content playback.

FIG. 14 illustrates that in certain implementations, a viewer device stitches a received manifest together with a previously received manifest if present. Furthermore, a viewer device can optimize the manifest download process by not requesting overlapped temporal ranges and/or playback options.

In some implementations, stitching involves having the viewer device generate a manifest file based on information received in two or more separate manifest files. In other implementations, stitching involves having the viewer device transition from using a first manifest file to using a subsequently received second manifest file when generating a request for a segment of media content, such as when changing from one video quality level to a different video quality level. In certain implementations, stitching involves having the viewer device transition between using a first manifest file to using both the first manifest file and a subsequently received second manifest file, such as when concurrently requesting a segment of video using the first manifest file and a segment of a new audio language using the second manifest file. It should be appreciated that reference to manifest file is not limited to being a discrete file in a file system, and may correspond to different information within a file, or different information in multiple files.

For example, in response to a first request for a partitioned manifest, media server 1425 provided manifest 1422A indicating a 1080p playback option in adaptation set 1432A and an English AAC-LC playback option in adaptation set 1428B for the temporal range corresponding to segments D-F.

After watching segment D of the media content, viewer device 1405 selects a new language, such as German, and viewer device 1405 sends a second request to media server 1425 for the new language for segments E-F. Media server 1425 provides second manifest 1422B with only the German language playback option for the minimum bit rate and maximum bit rate constraint specified in the second request. Furthermore, manifest 1422B does not include segment D for the German audio playback option. Viewer device 1405 replaces the existing English audio language adaptation set 1428A with the new German audio language adaptation set 1428B, and stitches the new German audio language adaptation set 1428B with the previously received adaptation set 1432A with 1080p video. In some implementations, viewer device 1405 stitches manifest 1422B which includes manifest data for the German audio with the previously received manifest 1422A which includes manifest data for the 1080p video by generating a new manifest file that excludes the manifest data for English audio. In other implementations, viewer device 1405 stitches manifest data by overwriting in the previously received manifest file 1422A the manifest data for the English audio with the manifest data for the German audio from manifest 1422B. In further implementations, viewer device 405 stitches manifest data together by referencing manifest 1422A to generate a request for a segment of 1080p video, and referencing manifest 1422B to generate a request for a segment of German audio at this time synchronized to the requested segment of 1080p video.

Thus, for each implementation, viewer device 1405 does not re-download manifest data relating to the 1080p playback option for segments D-F.

An example of a manifest request to a server with a base URL of "http://s3.ll.dash.us.aivcdn.net/" that specifies the German language audio adaptation set using "lang=de," an AAC-LC audio playback option using the bitrate range constraint of "minAudioBitRate=128000" and "maxAudioBitRate=128000," and a temporal range using "startTime=4000" and "endTime=5000000," is as follows: http://s3.ll.dash.us.aivcdn.net/d/1$ADVBD696BHNV5, 1871E004/cfb7/6a18/1d37/4222-80f4-006b1a408e92/ 7d42a9c4-ccae-416d-9749-1f3475a534a0_corrected. mpd?lang=de&minAudioBitRate=128000&maxAudioBitRate=128 000&startTime=4000&endTime=5000000

In some implementations, playback option partitioning may be dynamic. For example, playback options can be added or removed from each manifest file provided by the media server 1225 to a viewer device during the streaming of the media content, such as in response to changing network conditions. In some implementations, the addition or removal of playback options are controlled by media server 1225 or another server in the content delivery network, such as to perform server-side throttling of viewer device resource consumption. In other implementations, the viewer device delays retrieval of certain playback options, such as quality levels and/or entire adaptation sets, based on the conditions detected by the viewer device. For example, when initiating playback of media content, a viewer device obtains a single playback option for video and a single playback option for audio to minimize the wait time for downloading of the manifest. Once playback of the media content has started, the viewer device obtains additional playback options. It should be appreciated that the dynamic selection of playback options can include both server-side and client-side control algorithms.

FIG. 14 illustrates an example of dynamic playback option partitioning. For manifest 1422A, media server 1425 provided only the video quality level corresponding to 1080p. However, as playback of segments D-F described in manifest 1422A progresses (with or without the switchover to the German language as described above), as an example, at about 10 seconds before the corresponding end time of the temporal range, viewer device 1405 requests a partitioned manifest for a subsequent temporal range corresponding to a set of segments, such as segments G-I.

In contrast to manifest thinning techniques where a media server removes certain quality levels and adaptation sets only in the beginning of playback session, media server 1425 can further remove or add playback options as playback of the media content progresses. For example, due to improvements in the network condition at the time when manifest 1422C is being requested, media server 1425 includes the UHD playback option in manifest 1422C. While there is no overlap in the segments described in manifest 1422C and manifests 1422A-B (or any new manifest generated by the viewer device based on manifests 1422A-B), the viewer device can still temporally stitch manifest 1422C with an earlier manifest. For example, after requesting the last segment of 1080p video using the manifest data in manifest 1422A, corresponding to segment F, the viewer device can transition to the next segment of video, corresponding to segment G, that is described in manifest 1422C for the 1080p and UHD playback options.

Further examples of scenarios involving dynamically altering the playback options selected for a partitioned manifest includes a user switching subtitles, viewing an alternate camera angle, switching between different surround sound profiles, or changing the field of depth for 3D video data. It should be appreciated that the dynamic selection of playback options to include can be in response to indications of user actions, changes in network conditions, changes in the hardware attributes of the viewer device, changes in a profile associated with the viewer device (such as the subscription plan), or changes in digital rights management status.

In various implementations, the disclosed techniques allow dynamic partitioning of manifest data within a group of playback options (e.g., an adaptation set for MPEG DASH), between different groups of playback options, or a combination of both. For example, viewer device 1405 accommodates switching between representations in different adaptation sets without interrupting playback and/or re-downloading previously received manifest data. In certain implementations, during playback of a representation in the first adaptation set, even after a request to change to a representation in a second adaptation set, viewer device 1405 may continue to play media content based on previously received manifest data corresponding to the representation in the first adaptation set. When playback has reached at least until a transition point, the audio/video decoders are reconfigured and the representation in the second adaptation set is decoded and displayed by viewer device 1405. For example, a transition point includes an instantaneous decoder refresh (IDR) picture, a clean random access (CRA) picture, or other random access point (RAP) picture.

Figure 15:
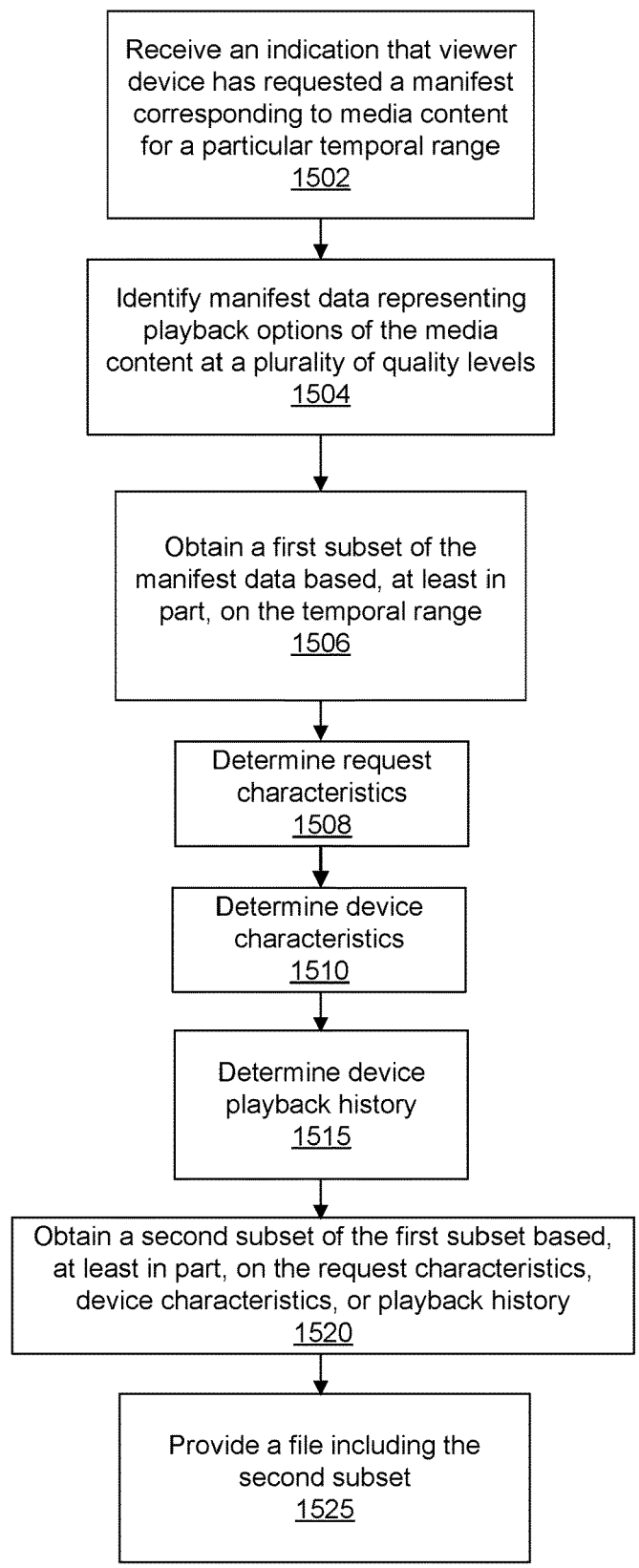
FIG. 15 is a flowchart illustrating a method of performing manifest partitioning for media content playback.

FIG. 15 is a flowchart illustrating performing manifest partitioning for media content playback. Manifest partitioning is performed by one or more servers such as media server 1225 and/or manifest server 1230. Partitioning of a manifest is performed prior to receiving a request for media content such that subsets of the manifest are stored for servicing media content requests at a later time. Alternatively, partitioning of a manifest is performed dynamically in response to a request for media content.

An indication that a viewer device has requested a manifest corresponding to media content for a particular temporal range is received at 1502. For example, the indication is received by media server 1225 as a parameter of the viewer device's request for a manifest corresponding to the media content. As another example, the indication is received by manifest server 1230 from media server 1225. The segment range is indicated by a start time, a duration, and/or an end time.

In other embodiments, the viewer device indicates a request for a segment range (e.g., only a portion of the manifest data for the media content) without indicating a particular segment range. In other words, the particular segment range (e.g., temporal range or range of segment indices) is implicit rather than explicit, similar to as described for FIG. 9.

Manifest data representing playback options of the media content is identified at 1504, where each of the playback options is associated with a corresponding plurality of segments. In various implementations, certain playback options are associated into a group of playback options, such as an adaptation set under MPEG DASH. In one implementation, the manifest data indicates, for each of the playback options, durations for the corresponding segments, and a start time for at least one of the corresponding segments.

A first subset of the manifest data is obtained at 1506 based, at least in part, on the particular temporal range indicated by the request in 1502. For example, the first subset of the manifest data corresponds to the particular temporal range requested by the viewer device, as described above with reference to manifest 1220, manifest 1222, or manifest 1240 of FIG. 12. The first subset of the manifest data is obtained from a conventional manifest or a manifest in which the contents have been enhanced, such as, for example, to simplify parsing.

In 1508, characteristics of the request made by the viewer device to stream media content are determined. For example, indications of minimum and maximum audio/video bitrates, camera perspective, field of depth, audio and/or subtitle language preferences, audio codec preferences, etc., are determined. The characteristics of the request correspond to particular playback options available for the media content. For example, a minimum and maximum video bit rate characteristic in the HTTP request can correspond to playback options including 720p and 1080p video, but excluding playback options such as UHD video.

In 1510, characteristics of the viewer device are considered when determining playback options to include. For example, media server 1225 provides a device identification to manifest server 1230, or media server 1225 provides another type of identifier (e.g., one related to the account being used by viewer device, or digital rights management information) that is correlated with the type of viewer device that is requesting to play back the media content. The data regarding types of devices and the quality levels they might exclude are detailed within system data 340 of FIG. 3. In some implementations, the location of the device is also used to select the playback options to include in a manifest file. For example, a device in one geographic region might be provided higher quality levels than another device in another geographic region.

At 1515, manifest server 1230 or media server 1225 also determines information regarding the playback history of the viewer device. For example, if the viewer device has a history of rebuffering at a particular time (such as many family members using the Internet connection for a variety of purposes at the same time on most weekdays), then a playback option corresponding to a higher quality level is excluded from the manifest file. Additionally, playback history of multiple viewer devices in the aggregate are considered when generating a manifest file. For example, if the viewer device is in a location in which rebuffering by other viewer devices is particularly common at a certain time, then higher quality levels are excluded from the manifest file.

A second subset of the first subset of the manifest data is obtained at 1520 based, at least in part, on the determinations relating to request characteristics, device characteristics, or playback history, and a manifest file including the second subset of the manifest data is provided to the viewer device at 1525.

It should be appreciated that the ordering depicted in FIG. 15 may be varied across implementations. For example, in certain implementations, obtaining a first subset of the manifest data based, at least in part, on the determinations relating to request characteristics, device characteristics, or playback history, occurs prior to obtaining a second subset from the first subset based, at least in part, on the temporal range specified in request 1502. Furthermore, certain implementations may not obtain a first subset, and then obtain a second subset of the first subset, and instead applies the conditions relating to temporal partitioning and playback option partitioning in aggregate to obtain only a first subset that is included in a manifest file provided to a viewer device. It should further be appreciated that the determinations relating to the one or more criteria of request characteristics, device characteristics, or playback history, etc., are performed in any order. It should also be appreciated that in certain implementations, only playback option partitioning is performed, or alternatively, only temporal partitioning is performed.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A method, comprising:

receiving, by one or more servers, an indication of a first request for a first manifest file for media content, the first request being generated by a client device, the first request specifying a first temporal range for the media content;

identifying, by the servers, manifest data for the media content, the manifest data representing a plurality of playback options for the media content;

identifying, by the servers, a first subset of the manifest data based on the first temporal range, the first subset of the manifest data representing only a first set of segments of the media content associated with the first temporal range;

the first subset of the manifest data including first information corresponding to a first playback option in the plurality of playback options, the first information also corresponding to a first segment in the first set of segments, the first information including a start time for the first segment and a segment duration for the first segment, the first information being included in a first markup tag, and;

the first subset of the manifest data also including second information corresponding to the first playback option, the second information also corresponding to a second segment in the first set of segments, the second information including a segment duration for the second segment, the second information being included in a second markup tag;

generating, by the servers, the first manifest file that includes the first subset of the manifest data; and providing, by the servers, the first manifest file to the client device, the first manifest file corresponding to an adjusted temporal range determined by adjusting the start time or an end time based at least in part on boundaries, wherein the boundaries includes at least one of a first nearest boundary, a second nearest boundary, or an earliest ad boundary.

2. The method as recited in claim 1, wherein the first subset of the manifest data also includes third information corresponding to the first segment, the third information including a first URL corresponding to a network address for the first segment; and the first subset of the manifest data also includes fourth information corresponding to the second segment, the fourth information including a second URL corresponding to a network address for the second segment.

3. The method as recited in claim 2, wherein the first manifest file corresponds to a Dynamic Adaptive Streaming over HTTP (DASH) manifest file;

the first information including the start time for the first segment and the segment duration for the first segment is included in a <segmenttimeline> markup tag corresponding to the first markup tag, and the second information including the segment duration for the second segment is included in the <segmenttimeline> markup tag; and the third information including the first URL is included in a <segmentlist> markup tag corresponding to the second markup tag, and the fourth information including the second URL is included in the <segmentlist> markup tag.

4. The method as recited in claim 3, wherein the segment duration for the first segment is different from the segment duration for the second segment.

5. The method as recited in claim 1, further comprising: identifying the first subset of the manifest data based on one or more attributes of the client device, the first subset of the manifest data also representing fewer than all of the playback options for the first segments of the media content.

6. A computing device, comprising: one or more processors and memory configured to:
receive an indication of a first request for a first manifest file for media content, the first request being generated by a client device, the first request specifying a first temporal range for the media content;
identify manifest data for the media content, the manifest data representing a plurality of playback options for the media content;
identify a first subset of the manifest data based on the first temporal range, the first subset of the manifest data representing only a first set of segments of the media content associated with the first temporal range;
the first subset of the manifest data including first information corresponding to a first playback option in the plurality of playback options, the first information also corresponding to a first segment in the first set of segments, the first information including a start time for the first segment and a segment duration for the first segment, the first information being included in a first markup tag, and;
the first subset of the manifest data also including second information corresponding to the first playback option, the second information also corresponding to a second segment in the first set of segments, the second information including a segment duration for the second segment, the second information being included in a second markup tag;
generate the first manifest file that includes the first subset of the manifest data; and
provide the first manifest file to the client device, the first manifest file corresponding to an adjusted temporal range determined by adjusting the start time or an end time based at least in part on boundaries, wherein the boundaries includes at least one of a first nearest boundary, a second nearest boundary, or an earliest ad boundary.

7. The computing device as recited in claim 6, wherein the first subset of the manifest data also includes third information corresponding to the first segment, the third information including a first URL corresponding to a network address for the first segment; and
the first subset of the manifest data also includes fourth information corresponding to the second segment, the fourth information including a second URL corresponding to a network address for the second segment.

8. The computing device as recited in claim 7, wherein the first manifest file corresponds to a Dynamic Adaptive Streaming over HTTP (DASH) manifest file;
the first information including the start time for the first segment and the segment duration for the first segment is included in a <segmenttimeline> markup tag corresponding to the first markup tag, and the second information including the segment duration for the second segment is included in the <segmenttimeline> markup tag; and
the third information including the first URL is included in a <segmentlist> markup tag corresponding to the second markup tag, and the fourth information including the second URL is included in the <segmentlist> markup tag.

9. The method as recited in claim 8, wherein the segment duration for the first segment is different from the segment duration for the second segment.

10. The computing device as recited in claim 6, the processors and memory being further configured to: identify the first subset of the manifest data based on one or more attributes of the client device, the first subset of the manifest data also representing fewer than all of the playback options for the first segments of the media content.

11. A method, comprising:
receiving an indication of a first request for media content, the first request being generated by a client device, the first request specifying a first temporal range for the media content, the first temporal range being less than a complete temporal range for the media content;
identifying manifest data for the media content, the manifest data representing a plurality of playback options for the media content;
identifying a first subset of the manifest data based on the first temporal range and one or more attributes of the client device, the first subset of the manifest data representing only first segments of the media content associated with the first temporal range, the first subset of the manifest data also representing fewer than all of the playback options for the first segments of the media content; and
providing a first manifest file including the first subset of the manifest data to the client device, the first manifest file corresponding to an adjusted temporal range determined by adjusting a start time for the first temporal range or an end time of the first temporal range based at least in part on boundaries, wherein: the plurality of playback options for the media content includes:
a first playback option corresponding to a first video resolution;
a second playback option corresponding to a second video resolution, the first playback option and the second playback option being included in a first group of playback options;
a third playback option corresponding to a first audio language, the third playback option being included in a second group of playback options;
a fourth playback option corresponding to a second audio language, the fourth playback option being included in a third group of playback options; and
the boundaries includes at least one of a first nearest boundary, a second nearest boundary, or an earliest ad boundary.

12. The method as recited in claim 11, wherein the manifest data is also based in part on compatibility of the plurality of playback options with at least one of a digital rights management restriction, a network condition, or a user preference associated with the client device.

13. The method as recited in claim 11, wherein the first request indicates the first temporal range based on information corresponding to at least one of:
a manifest start time, a manifest end time, or a manifest duration.

14. The method as recited in claim 11,
the method further comprises:
receiving a second request from the client device, the second request representing switching from the first playback option in the first group of playback options to the second playback option in the first group of playback options, the second request corresponding to a second temporal range;
obtaining a second subset of the manifest data, wherein the second subset of the manifest data includes the second playback option in the first group of playback options; and
providing a second manifest file including the second subset of the manifest data to the client device for replacement of the first playback option in the first group of playback options in the first manifest file, and for combining with the second group of playback options in the first manifest file.

15. The method as recited in claim 11,
the method further comprises:
receiving a second request from the client device, the second request representing switching from the third playback option in the second group of playback options to the fourth playback option in the third group of playback options, the second request corresponding to a second temporal range;
obtaining a second subset of the manifest data, wherein the second subset of the manifest data includes the fourth playback option in the third group of playback options; and
providing a second manifest file including the second subset of the manifest data to the client device for replacement of the third playback option in the second group of playback options in the first manifest file, and for combining with the first group of playback options in the first manifest file.

16. The method as recited in claim 11, further comprising: prior to receiving the indication of the first request from the client device for the first manifest, partitioning the manifest data such that a plurality of manifest files are generated; and
wherein providing the first manifest file includes transmitting one of the plurality of manifest files to the client device.

17. A computing device, comprising: one or more processors and memory configured to:
receive an indication of a first request for media content, the first request being generated by a client device, the first request specifying a first temporal range for the media content, the first temporal range being less than a complete temporal range for the media content;
identify manifest data for the media content, the manifest data representing a plurality of playback options for the media content;
identify a first subset of the manifest data based on the first temporal range and one or more attributes of the client device, the first subset of the manifest data representing only first segments of the media content associated with the first temporal range, the first subset of the manifest data also representing fewer than all of the playback options for the first segments of the media content; and
provide a first manifest file including the first subset of the manifest data to the client device, the first manifest file corresponding to an adjusted temporal range determined by adjusting a start time for the first temporal range or an end time of the first temporal range based at least in part on boundaries, wherein: the plurality of playback options for the media content includes:
a first playback option corresponding to a first video resolution;
a second playback option corresponding to a second video resolution, the first playback option and the second playback option being included in a first group of playback options;
a third playback option corresponding to a first audio language, the third playback option being included in a second group of playback options;
a fourth playback option corresponding to a second audio language, the fourth playback option being included in a third group of playback options; and
the boundaries includes at least one of a first nearest boundary, a second nearest boundary, or an earliest ad boundary.

18. The computing device as recited in claim 17, wherein the manifest data is also based in part on compatibility of the plurality of playback options with at least one of a digital rights management restriction, a network condition, or a user preference associated with the client device.

19. The computing device as recited in claim 17, wherein the first request indicates the first temporal range based on information corresponding to at least one of:
a manifest start time, a manifest end time, or a manifest duration.

20. The computing device as recited in claim 17,
the processors and memory being further configured to:
receive a second request from the client device, the second request representing switching from the first playback option in the first group of playback options to the second playback option in the first group of playback options, the second request corresponding to a second temporal range;
obtain a second subset of the manifest data, wherein the second subset of the manifest data includes the second playback option in the first group of playback options; and
provide a second manifest file including the second subset of the manifest data to the client device for replacement of the first playback option in the first group of playback options in the first manifest file, and for combining with the second group of playback options in the first manifest file.

21. The computing device as recited in claim 17,
the processors and memory being further configured to:
receive a second request from the client device, the second request representing switching from the third playback option in the second group of playback options to the fourth playback option in the third group of playback options, the second request corresponding to a second temporal range;
obtain a second subset of the manifest data, wherein the second subset of the manifest data includes the fourth playback option in the third group of playback options; and
provide a second manifest file including the second subset of the manifest data to the client device for replacement of the third playback option in the second group of playback options in the first manifest file, and for combining with the first group of playback options in the first manifest file.

22. The computing device as recited in claim 17, the processors and memory being further configured to:

prior to receiving the indication of the first request from the client device for the first manifest, partition the manifest data such that a plurality of manifest files are generated; and wherein providing the first manifest file includes transmitting one of the plurality of manifest files to the client device.

* * * * *

UNITED STATES PATENT AND TRADEMARK OFFICE
CERTIFICATE OF CORRECTION

| | | |
|---|---|---|
| PATENT NO. | : 10,432,690 B1 | Page 1 of 3 |
| APPLICATION NO. | : 15/888410 | |
| DATED | : October 1, 2019 | |
| INVENTOR(S) | : Lei Li et al. | |

It is certified that error appears in the above-identified patent and that said Letters Patent is hereby corrected as shown below:

In the Claims

Column 34, Line 32, Claim 1:
Delete: "markup tag, and;"
Insert: --markup tag;--

Column 34, Line 46, Claim 1:
Delete: "boundaries, wherein the boundaries includes at least"
Insert: --boundaries, wherein the boundaries include at least--

Column 35, Line 35, Claim 6:
Delete: "markup tag, and;"
Insert: --markup tag;--

Column 35, Line 49, Claim 6:
Delete: "boundaries includes at least one of a first nearest"
Insert: --boundaries include at least one of a first nearest--

Column 36, Lines 41-57, Claim 11:
Delete: "at least in part on boundaries, wherein: the plurality of
playback options for the media content includes:
a first playback option corresponding to a first video
    resolution;
a first playback option corresponding to a first video resolution;
a second playback option corresponding to a second video
    resolution, the first playback option and the second
    playback option being included in a first group of playback options;

Signed and Sealed this
Thirty-first Day of December, 2019

Andrei Iancu
*Director of the United States Patent and Trademark Office*

CERTIFICATE OF CORRECTION (continued)
U.S. Pat. No. 10,432,690 B1 a third playback option corresponding to a first audio
    language, the third playback option being included in a second group of
    playback options;
a fourth playback option corresponding to a second audio
    language, the fourth playback option being included in
    a third group of playback options; and
the boundaries includes at least one of a first nearest
    boundary, a second nearest boundary, or an earliest ad
    boundary."
Insert: --at least in part on boundaries, wherein the plurality of
    playback options for the media content includes:
        a first playback option corresponding to a first video
resolution;
        a second playback option corresponding to a second video
resolution, the first playback option and the second
playback option being included in a first group of playback options;
        a third playback option corresponding to a first audio
language, the third playback option being included in a second group of
playback options;
        a fourth playback option corresponding to a second audio
language, the fourth playback option being included in
a third group of playback options; and
        the boundaries include at least one of a first nearest
boundary, a second nearest boundary, or an earliest ad
boundary.--

Column 38, Lines 1-17, Claim 17:
Delete: "at least in part on boundaries, wherein: the plurality of
playback options for the media content includes:
a first playback option corresponding to a first video
    resolution;
a first playback option corresponding to a first video resolution;
a second playback option corresponding to a second video
    resolution, the first playback option and the second
    playback option being included in a first group of playback options;
a third playback option corresponding to a first audio
    language, the third playback option being included in a second group of
    playback options;
a fourth playback option corresponding to a second audio
    language, the fourth playback option being included in
    a third group of playback options; and
the boundaries includes at least one of a first nearest
    boundary, a second nearest boundary, or an earliest ad
    boundary."

CERTIFICATE OF CORRECTION (continued)
U.S. Pat. No. 10,432,690 B1

Insert: --at least in part on boundaries, wherein the plurality of playback options for the media content includes:
  a first playback option corresponding to a first video resolution;
  a second playback option corresponding to a second video resolution, the first playback option and the second playback option being included in a first group of playback options;
  a third playback option corresponding to a first audio language, the third playback option being included in a second group of playback options;
  a fourth playback option corresponding to a second audio language, the fourth playback option being included in a third group of playback options; and
  the boundaries include at least one of a first nearest boundary, a second nearest boundary, or an earliest ad boundary.--